United States Patent [19]
Kasai et al.

[11] Patent Number: 5,627,618
[45] Date of Patent: May 6, 1997

[54] COMPACT HIGH-ZOOM-RATIO REAL-IMAGE FINDER

[75] Inventors: Ichiro Kasai, Sakai; Katsuto Tanaka, Kawachinagano, both of Japan

[73] Assignee: Minolta Camera Kabushiki Kaisha, Osaka, Japan

[21] Appl. No.: 264,490

[22] Filed: Jun. 23, 1994

[30] Foreign Application Priority Data

Jun. 29, 1993 [JP] Japan ................................ 5-158571
Jul. 13, 1993 [JP] Japan ................................ 5-172840

[51] Int. Cl.$^6$ ............................ G03B 13/10; G02B 15/14
[52] U.S. Cl. ................................................ 396/379; 359/688
[58] Field of Search ........................... 354/222, 149.11, 354/149.1; 359/688, 380

[56] References Cited

U.S. PATENT DOCUMENTS

| | | | |
|---|---|---|---|
| 4,572,620 | 2/1986 | Kikuchi | 350/427 |
| 4,834,513 | 5/1989 | Nozawa | 350/427 |
| 4,842,395 | 6/1989 | Sato et al. | |
| 5,028,125 | 7/1991 | Kikuchi | |
| 5,335,030 | 8/1994 | Suzuka | 354/149.1 |
| 5,400,101 | 3/1995 | Yoneyama et al. | 354/222 |

FOREIGN PATENT DOCUMENTS 3-153206  7/1991  Japan.

*Primary Examiner*—Safet Metjahic
*Assistant Examiner*—Daniel Chapik
*Attorney, Agent, or Firm*—Burns, Doane, Swecker & Mathis, LLP

[57] ABSTRACT

A high-zoom-ratio real-image finder is provided with an objective lens system including a first lens unit having a positive power, a second lens unit having a negative power, a third lens unit having a negative power and a fourth lens unit having a positive power. Zooming is performed by moving the second and third lens units always in the same direction. A luminous flux restricting member is integrated with a holder for the second lens unit. A zoom strobe unit moves integrally with a holder for the third lens unit.

8 Claims, 22 Drawing Sheets

Spherical aberration

Astigmatism

Distortion

Spherical aberration

Astigmatism

Distortion

Spherical aberration

Astigmatism

Distortion h=2

—— e-line

-1.00  1.00
(diopter)
Spherical
aberration

ω=25.27°

—— DS
---- DT

-1.00  1.00
(diopter)
Astigmatism

ω=25.27°

-5.00  5.00
(%)
Distortion h=2

—— e-line

-1.00  1.00
(diopter)
Spherical
aberration

ω=14.52°

—— DS
---- DT

-1.00  1.00
(diopter)
Astigmatism

ω=14.52°

-5.00  5.00
(%)
Distortion h=2

—— e-line

-1.00  1.00
(diopter)
Spherical
aberration

ω=8.09°

—— DS
---- DT

-1.00  1.00
(diopter)
Astigmatism

ω=8.09°

-5.00  5.00
(%)
Distortion h=2

-1.00  1.00
(diopter)
Spherical
aberration

ω =25.19°

-1.00  1.00
(diopter)
Astigmatism

ω =25.19°

-5.00  5.00
(%)
Distortion h=2

-1.00  1.00
(diopter)
Spherical
aberration

ω =14.06°

-1.00  1.00
(diopter)
Astigmatism

ω =14.06°

-5.00  5.00
(%)
Distortion h=2

-1.00  1.00
(diopter)
Spherical
aberration

ω =7.60°

-1.00  1.00
(diopter)
Astigmatism

ω =7.60°

-5.00  5.00
(%)
Distortion h=2
— e-line
-1.00  1.00
(diopter)
Spherical aberration ω=25.19°
—— DS
--- DT
-1.00  1.00
(diopter)
Astigmatism ω=25.19°
-5.00  5.00
(%)
Distortion h=2
— e-line
-1.00  1.00
(diopter)
Spherical aberration ω=12.23°
—— DS
--- DT
-1.00  1.00
(diopter)
Astigmatism ω=12.23°
-5.00  5.00
(%)
Distortion h=2
— e-line
-1.00  1.00
(diopter)
Spherical aberration ω=5.71°
—— DS
--- DT
-1.00  1.00
(diopter)
Astigmatism ω=5.71°
-5.00  5.00
(%)
Distortion h=2
— e-line
-1.00  1.00
(diopter)
Spherical aberration ω=25.19°
—— DS
—·— DT
-1.00  1.00
(diopter)
Astigmatism ω=25.19°
-5.00  5.00
(%)
Distortion h=2
— e-line
-1.00  1.00
(diopter)
Spherical aberration ω=11.20°
—— DS
—·— DT
-1.00  1.00
(diopter)
Astigmatism ω=11.20°
-5.00  5.00
(%)
Distortion h=2
— e-line
-1.00  1.00
(diopter)
Spherical aberration ω=4.77°
—— DS
—·— DT
-1.00  1.00
(diopter)
Astigmatism ω=4.77°
-5.00  5.00
(%)
Distortion

COMPACT HIGH-ZOOM-RATIO REAL-IMAGE FINDER

BACKGROUND OF THE INVENTION

1. Field of the Invention

The present invention relates to a compact high-zoom-ratio real-image finder, and more specifically, to a compact high-zoom-ratio real-image finder suitable for use in a lens shutter camera.

2. Description of the Prior Art

In recent years, a lens shutter camera has been required to have a high zoom ratio and to be small in size. It is therefore natural that a finder incorporated in the lens shutter camera is required to have specifications and configuration which meet the requirements. For example, to make the camera compact by reducing the thickness thereof, it is essential to decrease the length of a finder objective lens system (hereinafter referred to as "objective system").

U.S. Pat. No. 4,842,395 discloses a real-image zoom finder where the objective system comprises from the object side a negative and a positive lens units, zooming is performed by moving the second lens unit having a positive power, and the variation in dioptric power caused by zooming is compensated for by moving the first lens unit having a negative power. Moreover, U.S. Pat. No. 5,028,125 discloses a real-image zoom finder where the objective system comprises from the object side a positive, a negative and a positive lens units, and zooming is performed by moving the second lens unit having a negative power. Further, Japanese Laid-open Patent Application No. H3-153206 discloses a real-image zoom finder wherein the objective system comprises from the object side a positive, a negative, a negative and a positive lens units, and zooming is performed by moving the second and third lens units having a negative power.

In the type of the finder as disclosed in U.S. Pat. No. 4,842,395, it is difficult to excellently correct aberrations while achieving a high zoom ratio, and further, since the movement amount of the second lens unit having a positive power largely increases as the zoom ratio increases, the total length of the objective system increases. As a result, the thickness of the camera cannot be reduced. That is, to achieve a high zoom ratio with the two-unit objective system of negative, positive configuration, it is necessary to increases the movement amount of the second lens unit having a positive power. To secure the space therefor, the camera should be thick.

The movement amount can be reduced by increasing the power of each lens unit. However, if the power of each lens unit is increased, the sensitivity to work errors is high. The sensitivity to work errors is a degree of influence by the decentering of the lens. That the sensitivity to work errors is high means, for example, that the dioptric power variation and the parallax are large when the lens is decentered by a predetermined amount. When the sensitivity to work errors is high, it is difficult to manufacture the finder within a permissible work error range. Specifically, since a certain degree of backlash is necessary in the attachment structure of the lens to move the lens, when zooming is performed by moving a lens highly sensitive to errors, the suppression of work errors so as to be within the permissible range is difficult compared to the case where the lens is stationary.

In the type of the finder as disclosed in U.S. Pat. No. 5,028,125, it is difficult to excellently correct aberrations while achieving a high zoom ratio, and further, if the zoom ratio is increased, the variation in dioptric power caused by zooming increases. For this reason, it is necessary to correct the dioptric power by moving the first lens unit having a positive power or the third lens unit having a positive power or both of the first and third lens units. However, in the three-unit objective system of positive, negative, positive configuration, since the positive power is strong in the first and third lens units, the sensitivity to work errors (in particular, the sensitivity to the shift of the field due to the decentering of the lens) is high. Therefore, similarly to the above-described finder as disclosed in U.S. Pat. No. 4,842, 395, the suppression of work errors so as to be within the permissible range is difficult in this type of finder.

The type of the finder as disclosed in Japanese Laid-open Patent Application No. H3-153206 employs a four-unit objective system of positive, negative, negative, positive configuration with which it is easier to correct aberrations than with the other types. Further, since the first and fourth lens units having a strong positive power (the power of the fourth unit is particularly strong) are stationary, work errors are suppressed more easily. However, since the image formation magnification of the second lens unit having a negative power is negative in the entire zoom range, the third lens unit moves so as to make a U-turn. If the third lens unit makes a U-turn, the balance between the absolute movement amounts of the second and third lens units is broken, so that although the absolute movement amount of the third lens unit decreases, the movement amount of the second lens unit increases. Since the total length of the four-unit objective system of positive, negative, negative, positive configuration depends on the lens unit which largely moves, the total length of the objective increases in accordance with the increase in movement amount of the second lens unit. Therefore, in this type of finder, it is difficult to reduce the thickness of the camera.

SUMMARY OF THE INVENTION

An object of the present invention is to provide a compact high-zoom-ratio real-image finder which realizes a high zoom ratio of approximately 2.5 to 6× and where the total length of the objective lens system is small.

To achieve the above-mentioned object, a compact high-zoom-ratio real-image finder according to the present invention is provided with an objective lens system including a first lens unit having a positive power, a second lens unit having a negative power, a third lens unit having a negative power and a fourth lens unit having a positive power. Zooming is performed by moving the second and third lens units always in the same direction.

BRIEF DESCRIPTION OF THE DRAWINGS

This and other objects and features of this invention will become clear from the following description, taken in conjunction with the preferred embodiment with reference to the accompanied drawings in which.

DESCRIPTION OF THE PREFERRED EMBODIMENTS

Figure 1:
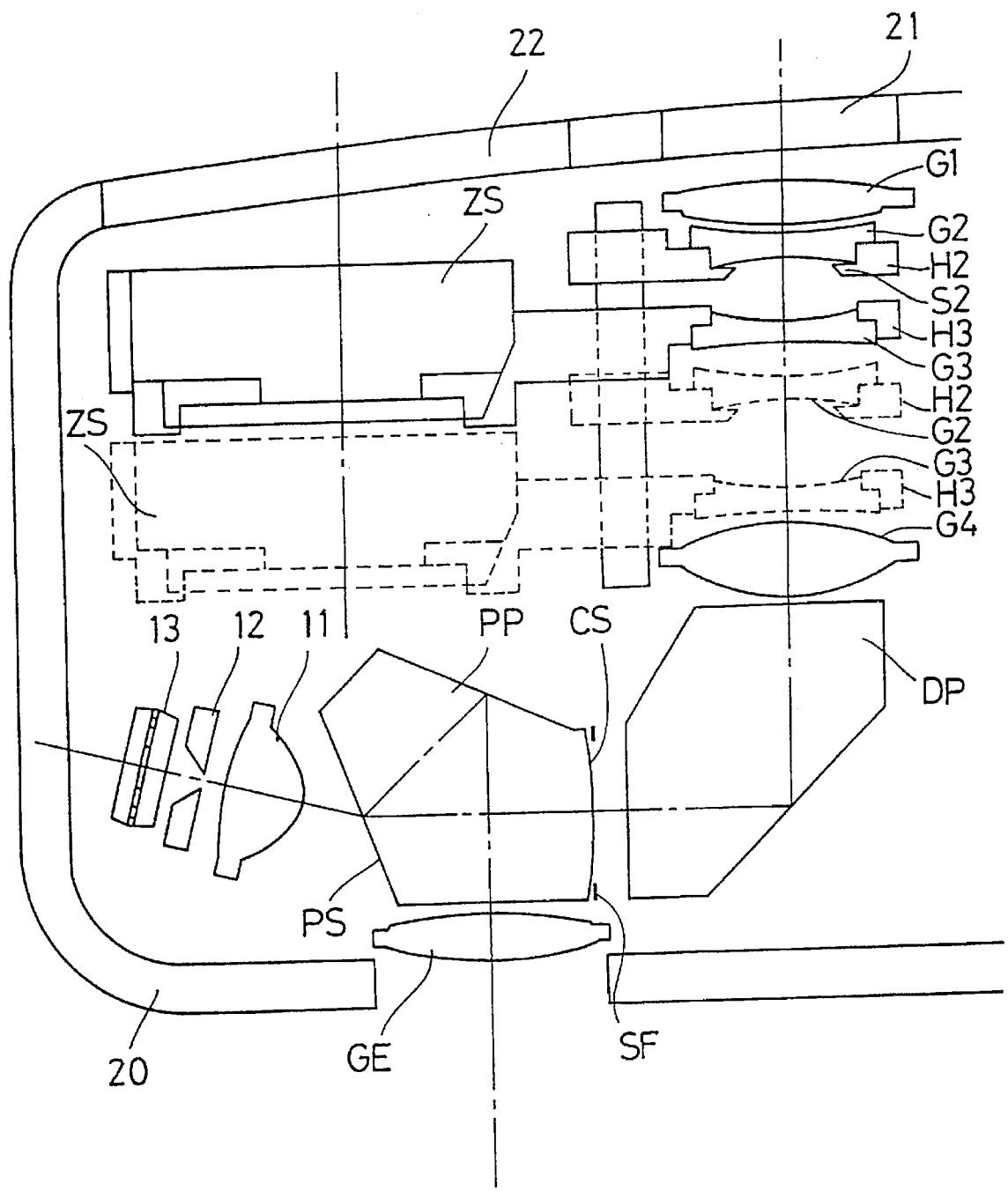
FIG. 1 is a cross-sectional view showing a first embodiment of the present invention incorporated in a camera body together with a photometric optical system.
Figure 2:
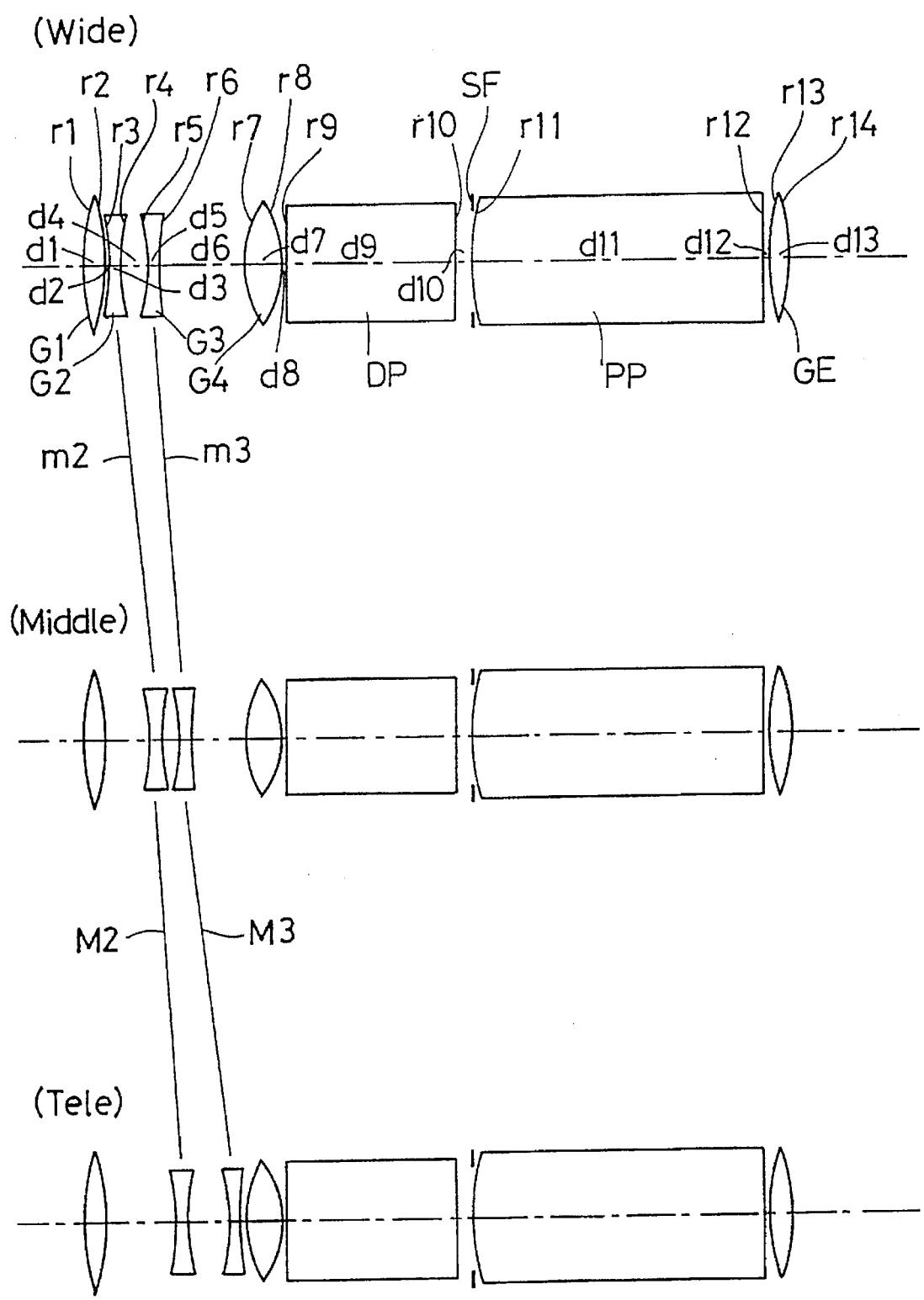
FIG. 2 is a cross-sectional view showing the arrangement of the first embodiment of the present invention.
Figure 3A:
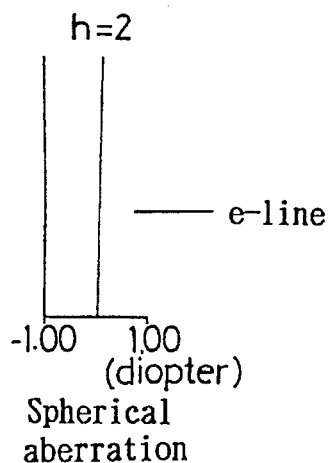
FIGS. 3A to 3C show the aberration curves of the first embodiment of the present invention at the shortest focal length condition.
Figure 3B:
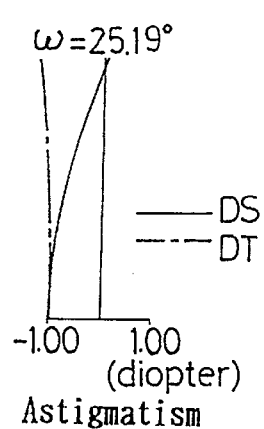
Figure 3C:
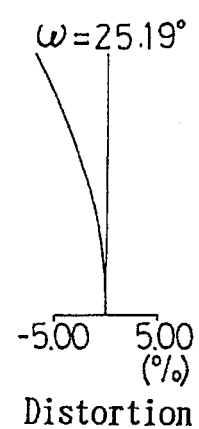
Figure 3D:
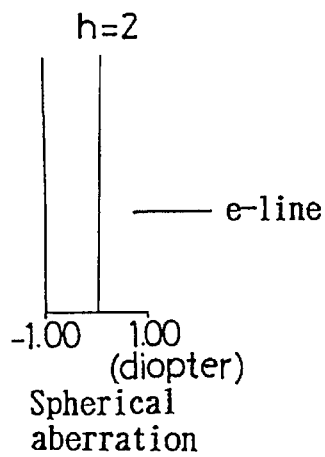
FIGS. 3D to 3F show the aberration curves of the first embodiment of the present invention at the middle focal length condition.
Figure 3E:
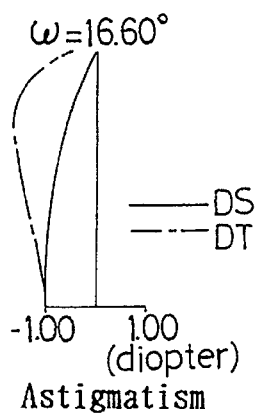
Figure 3F:
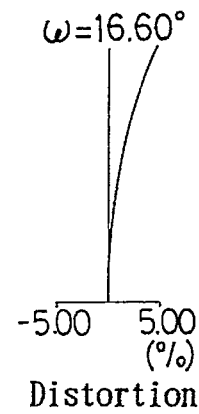
Figure 3G:
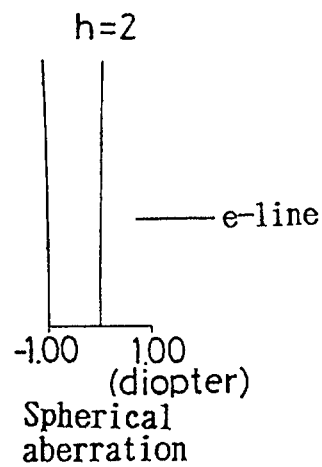
FIGS. 3G to 3I show the aberration curves of the first embodiment of the present invention at the longest focal length condition.
Figure 3H:
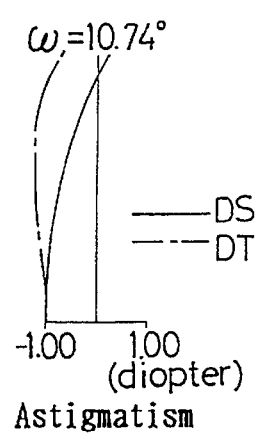
Figure 3I:
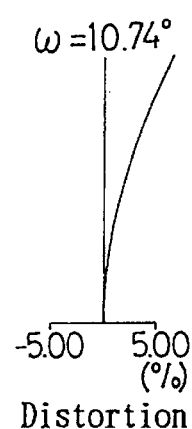
Figure 4:
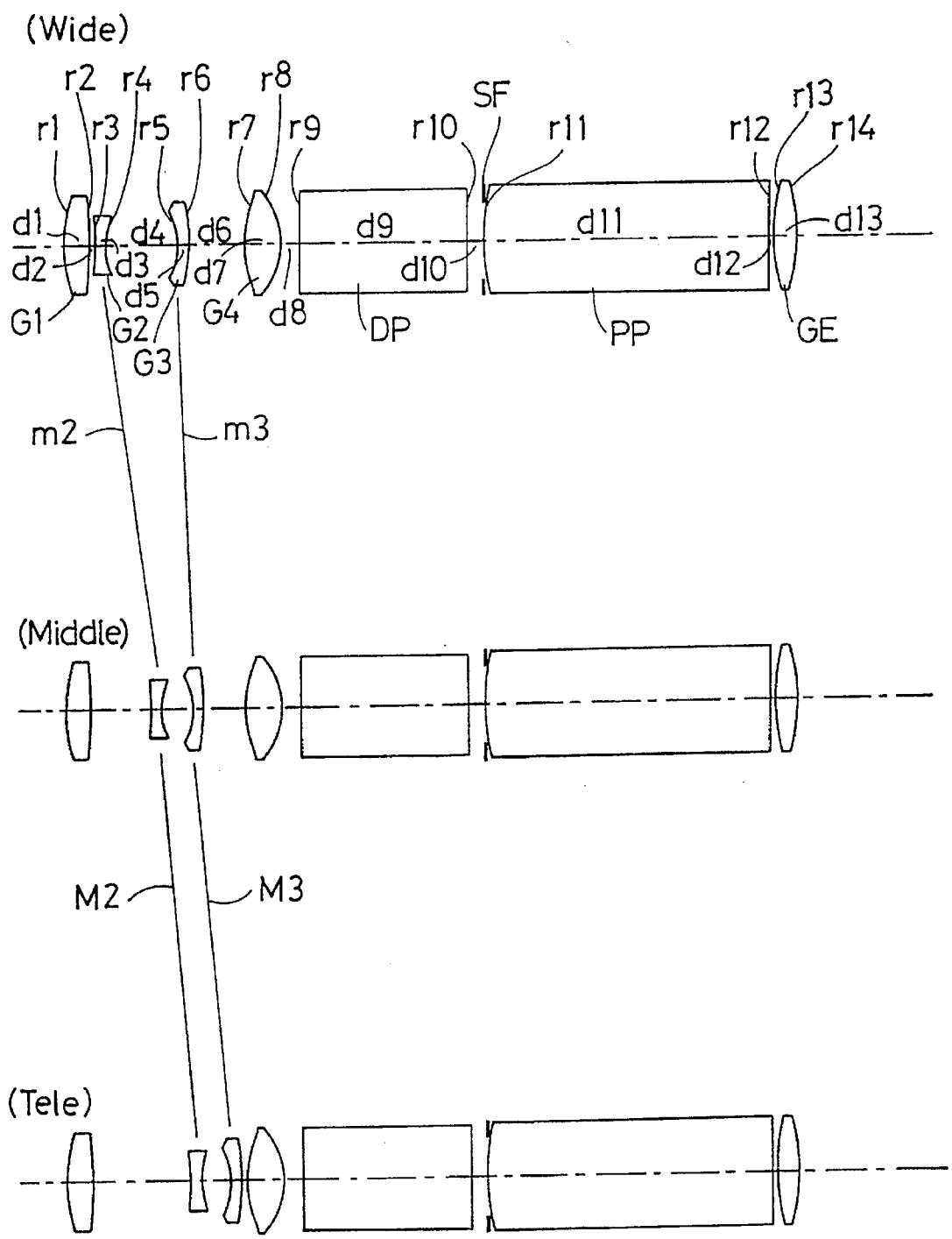
FIG. 4 is a cross-sectional view showing the arrangement of a second embodiment of the present invention.
Figure 5A:
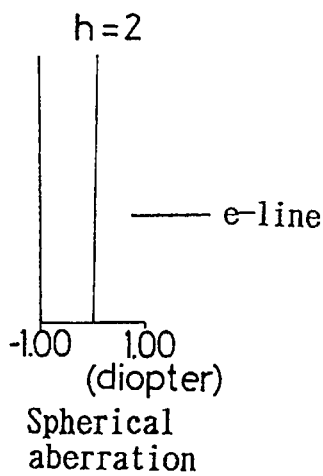
FIGS. 5A to 5C show the aberration curves of the second embodiment of the present invention at the shortest focal length condition.
Figure 5B:
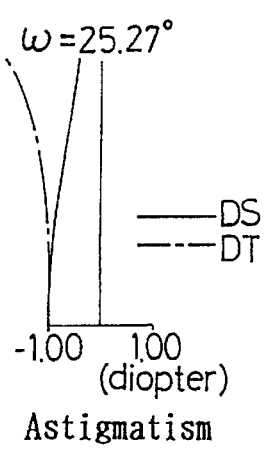
Figure 5C:
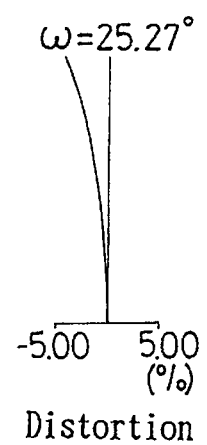
Figure 5D:
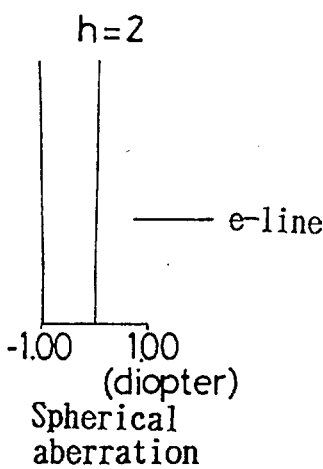
FIGS. 5D to 5F show the aberration curves of the second embodiment of the present invention at the middle focal length condition.
Figure 5E:
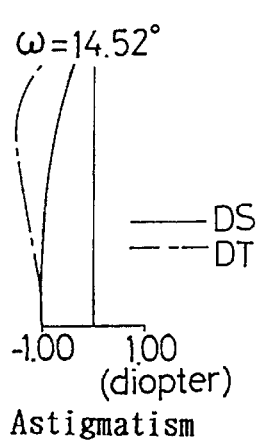
Figure 5F:
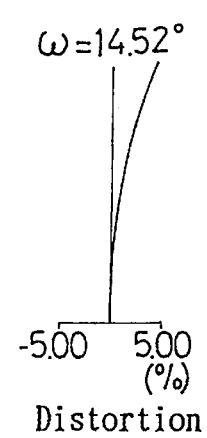
Figure 5G:
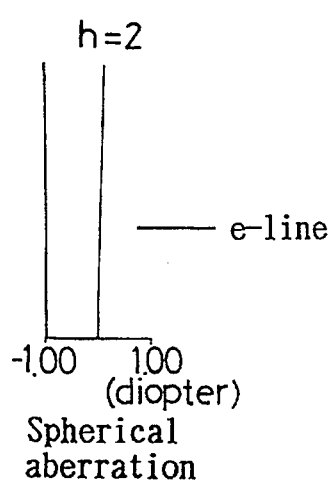
FIGS. 5G to 5I show the aberration curves of the second embodiment of the present invention at the longest focal length condition.
Figure 5H:
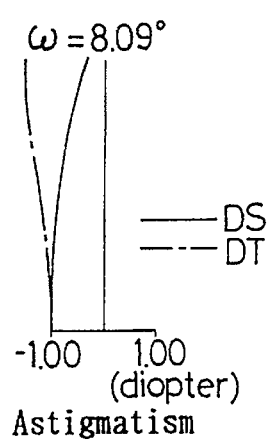
Figure 5I:
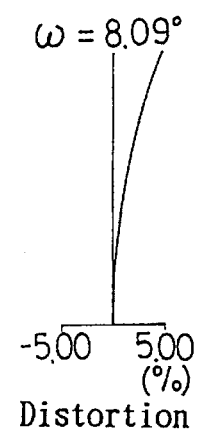
Figure 6:
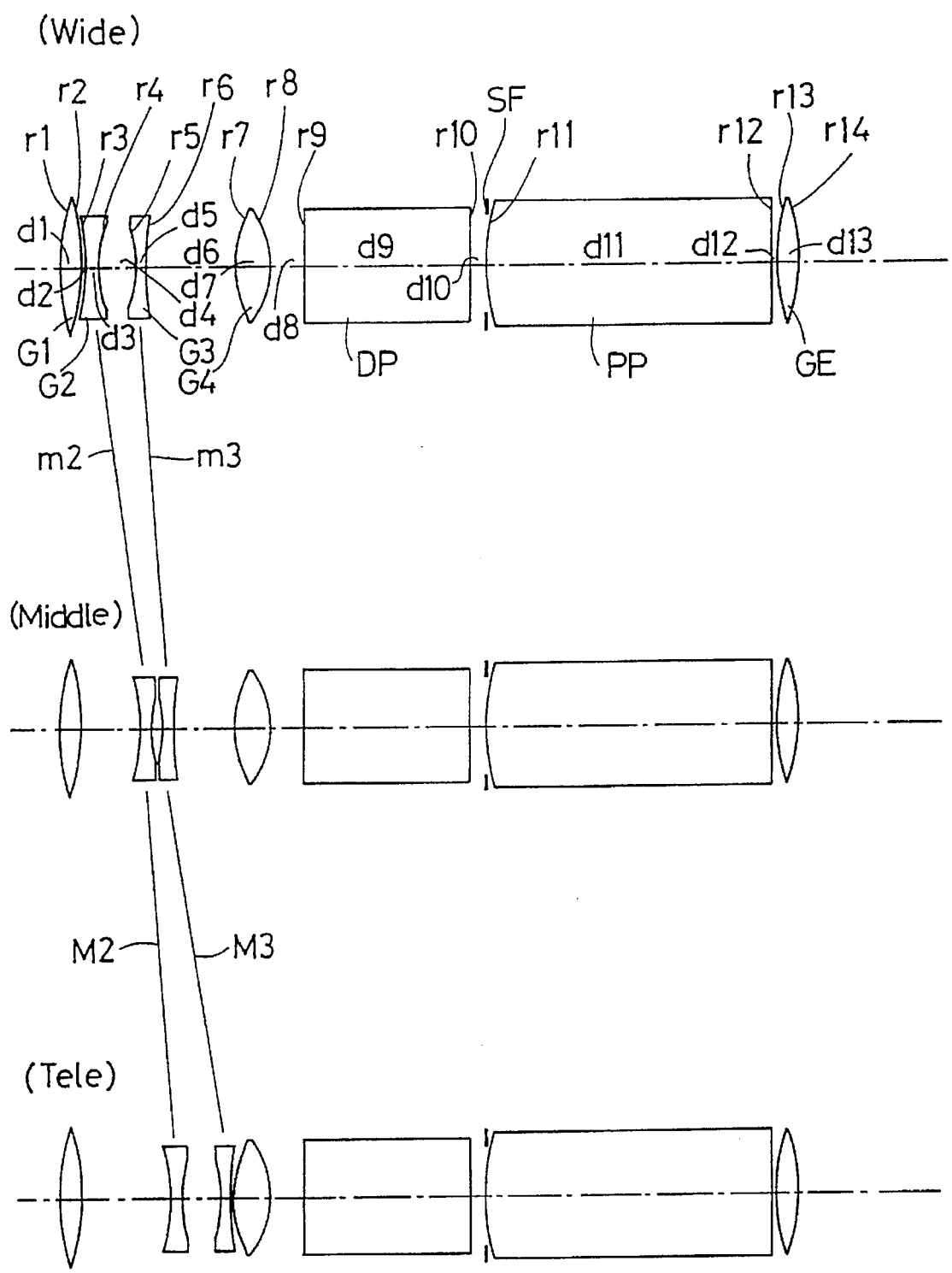
FIG. 6 is a cross-sectional view showing the arrangement of a third embodiment of the present invention.
Figure 7A:
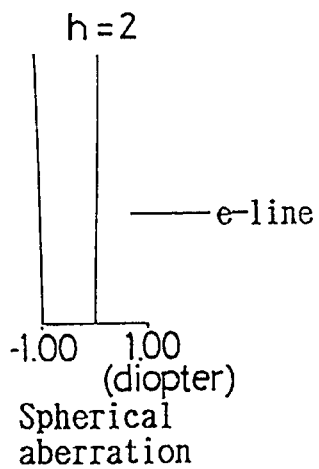
FIGS. 7A to 7C show the aberration curves of the third embodiment of the present invention at the shortest focal length condition.
Figure 7B:
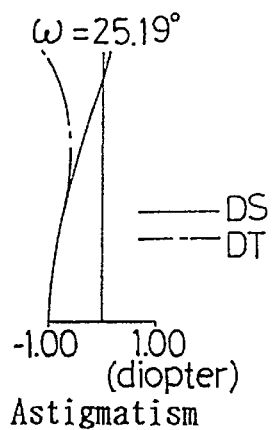
Figure 7C:
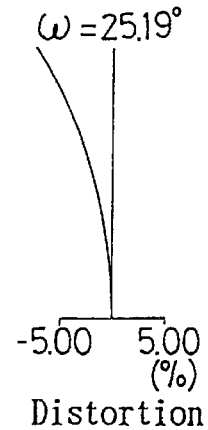
Figure 7D:
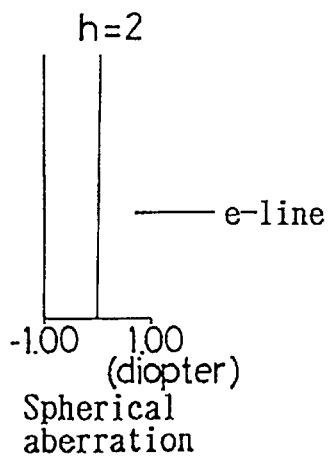
FIGS. 7D to 7F show the aberration curves of the third embodiment of the present invention at the middle focal length condition.
Figure 7E:
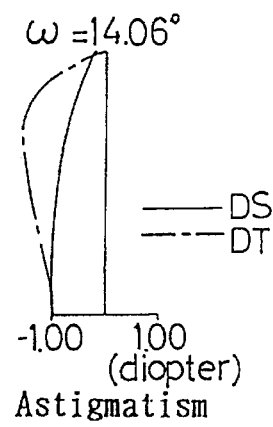
Figure 7F:
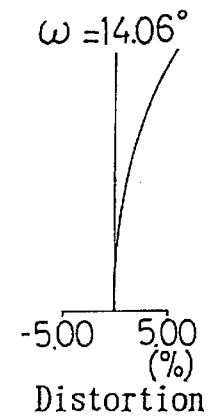
Figure 7G:
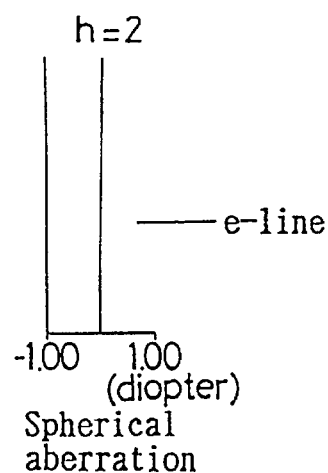
FIGS. 7G to 7I show the aberration curves of the third embodiment of the present invention at the longest focal length condition.
Figure 7H:
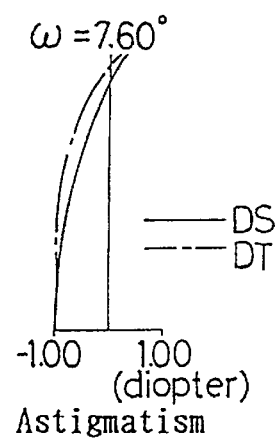
Figure 7I:
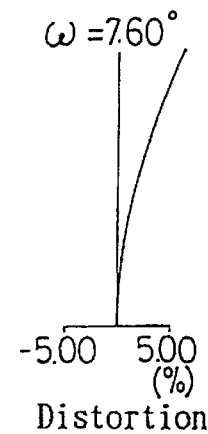
Figure 8:
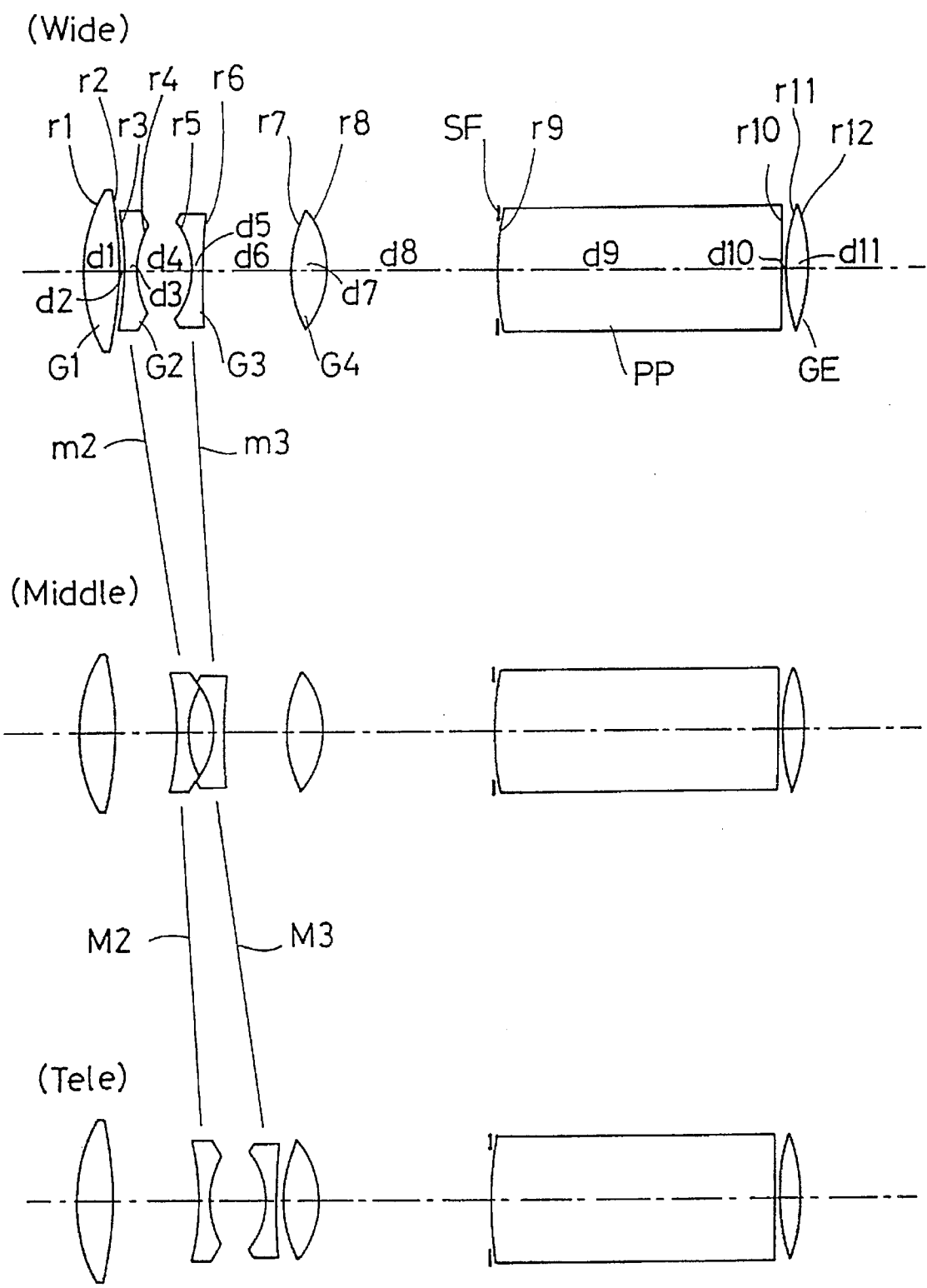
FIG. 8 is a cross-sectional view showing the arrangement of a fourth embodiment of the present invention.
Figure 9A:
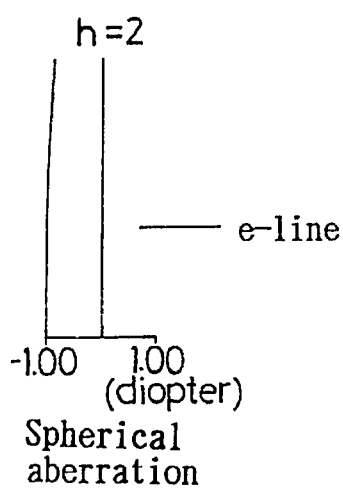
FIGS. 9A to 9C show the aberration curves of the fourth embodiment of the present invention at the shortest focal length condition.
Figure 9B:
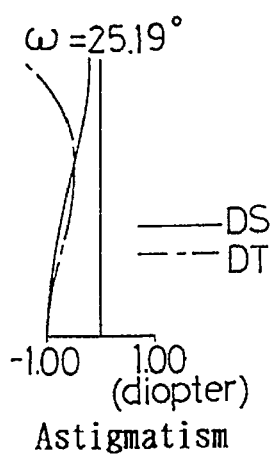
Figure 9C:
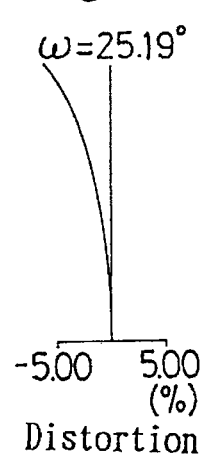
Figure 9D:
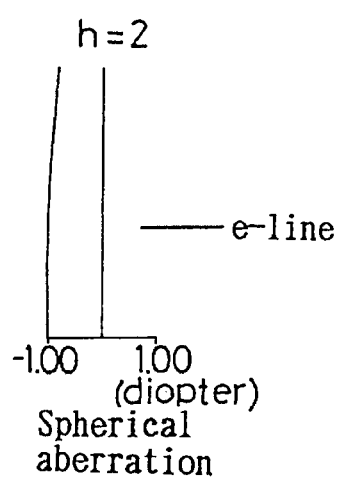
FIGS. 9D to 9F show the aberration curves of the fourth embodiment of the present invention at the middle focal length condition.
Figure 9E:
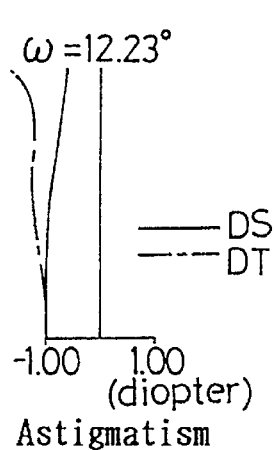
Figure 9F:
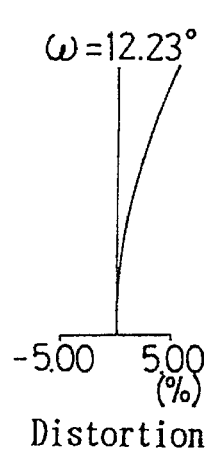
Figure 9G:
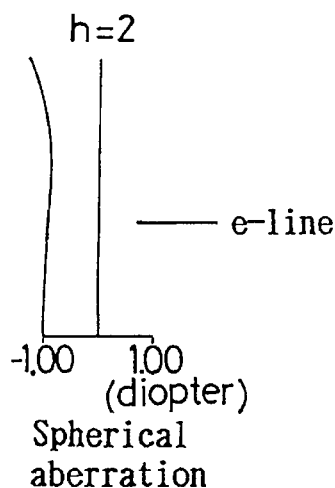
FIGS. 9G to 9I show the aberration curves of the fourth embodiment of the present invention at the longest focal length condition.
Figure 9H:
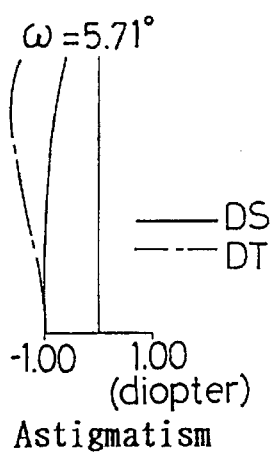
Figure 9I:
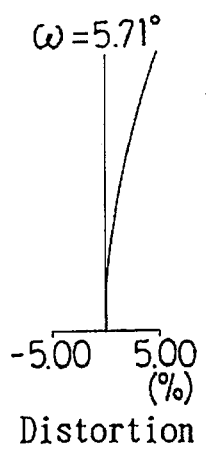
Figure 10:
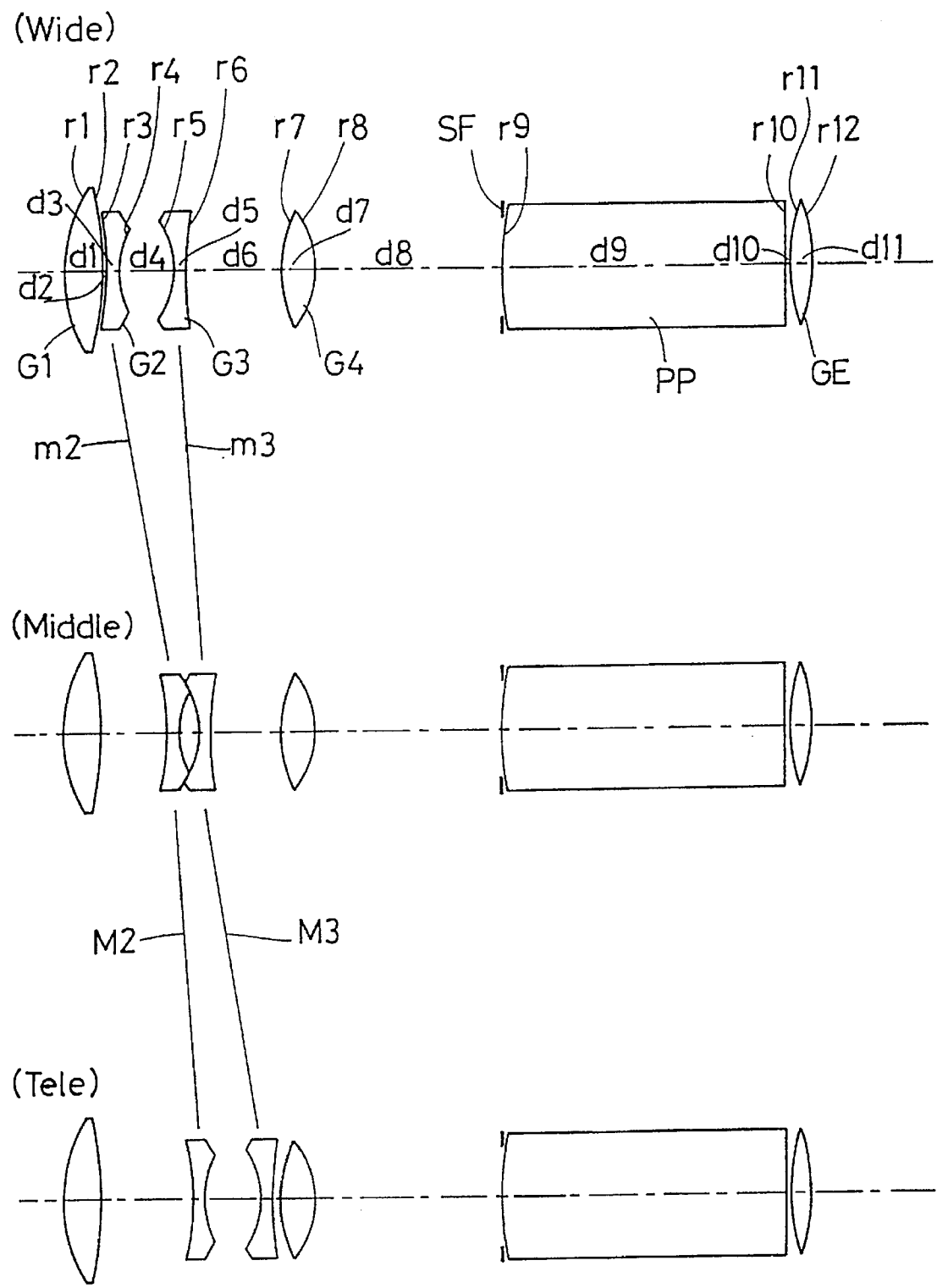
FIG. 10 is a cross-sectional view showing the arrangement of a fifth embodiment of the present invention.
Figure 11A:
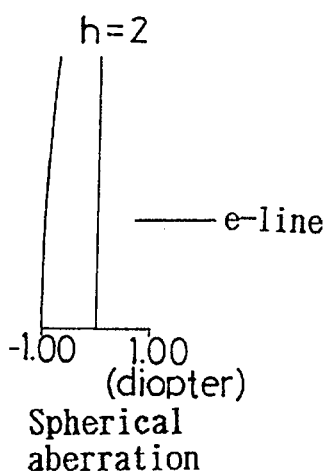
FIGS. 11A to 11C show the aberration curves of the fifth embodiment of the present invention at the shortest focal length condition.
Figure 11B:
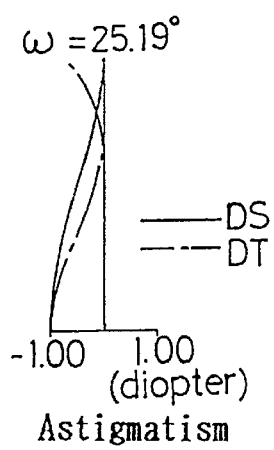
Figure 11C:
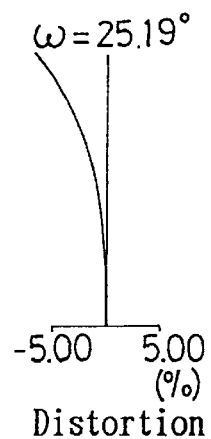
Figure 11D:
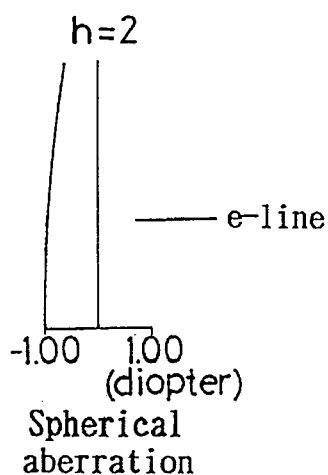
FIGS. 11D to 11F show the aberration curves of the fifth embodiment of the present invention at the middle focal length condition.
Figure 11E:
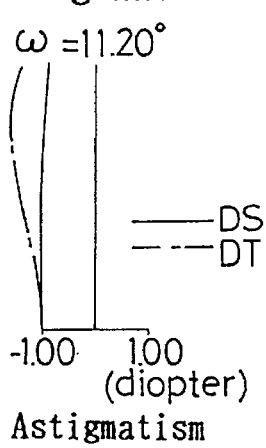
Figure 11F:
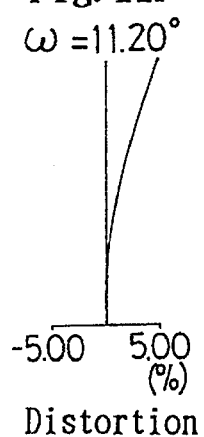
Figure 11G:
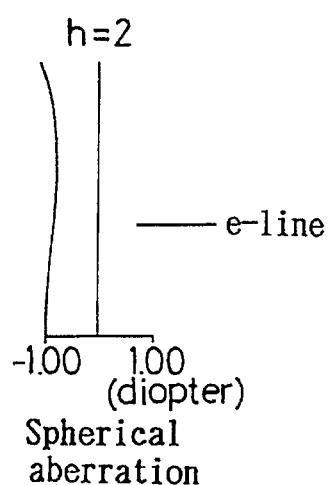
FIGS. 11G to 11I show the aberration curves of the fifth embodiment of the present invention at the longest focal length condition.
Figure 11H:
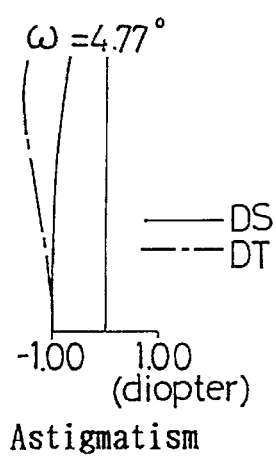
Figure 11I:
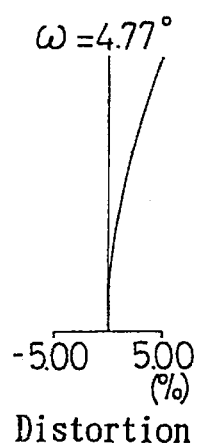

A compact high-zoom-ratio real-image finder according to the present invention is provided with an objective system comprising from the object side a first lens unit having a positive power, a second lens unit having a negative power, a third lens unit having a negative power and a fourth lens unit having a positive power. Zooming is performed by moving the second and third lens units always in the same direction.

Specifically describing the zooming performed by moving the second and third lens units always in the same direction, during zooming from a lower magnification condition (shorter focal length condition) to a higher magnification condition (longer focal length condition) of the finder, the second and third lens units are each moved always from the side of the first lens unit to the side of the fourth lens unit. During zooming from a higher magnification condition to a lower magnification condition of the finder, the second and third lens units are each moved always from the side of the fourth lens unit to the side of the first lens unit.

By moving the second and third lens units in this manner, the total length of the objective system is small compared to an objective system where any of the lens units makes a U-turn in zooming. As a result, a compact finder is realized. As described previously, in a four-unit objective system of positive, negative, negative, positive configuration, if either of the second and third lens units moves so as to make a U-turn in zooming, the absolute movement amount of the lens unit which makes a U-turn decreases. However, since the movement amount of the other lens unit increases invariably, the total length of the objective system increases. As a result, a compact finder cannot be realized.

The key to the reduction in total length of the objective system is the lens movement amount in zooming. In the four-unit lens system of positive, negative, negative, positive configuration like the objective system of the present invention, the balance between the movement amounts of the second and third lens units having a negative power is important. Since the total length of the objective system increases if the movement amount of either of the second and third lens units increases, the total length decreases by moving the second and third lens units so that the movement amount of one of the two lens units that is moved by a larger amount is minimum. Since the space required for the movements of the lenses in zooming decreases (i.e. the absolute movement amounts of the second and third lens units are restrained to be small) as the ratio between the absolute movement amounts of the second and third lens units approaches 1, the total length of the objective system decreases by moving the two lens units by substantially the same amount. As a result, a compact finder is realized.

Preferably, the lens system of the present invention fulfills the following condition (1):

$$\beta_{2T} > 0 \tag{1}$$

where $\beta_{2T}$ is an image formation magnification of the second lens unit at the highest magnification condition (i.e. longest focal length condition).

The condition (1) is a condition for moving the second and third lens units in the same direction from the object side to the finder exit pupil side in zooming from a shorter focal length condition to a longer focal length condition. When the lower limit of the condition (1) is exceeded, the third lens unit makes a U-turn. Since the movement amount of the second lens unit increases by the U-turn, the total length of the objective system increases. As a result, a compact finder cannot be realized.

Further, the lens system of the present invention preferably fulfills the following condition (2):

$$0.7 < \frac{\phi_2}{\phi_3} < 1.5 \qquad (2)$$

where $\phi_2$ is the power of the second lens unit and $\phi_3$ is the power of the third lens unit.

The condition (2) is a condition for realizing an excellent balance between the movement amounts of the second and third lens units in zooming. When the limits of the condition (2) are exceeded, the balance between the movement amounts of the second and third lens units is broken to increase the movement amount of either of the lens units, so that the total length of the objective system increases. As a result, a compact finder cannot be realized.

Further, the lens system of the present invention preferably fulfills the following condition (3):

$$0.7 < \frac{L_2}{L_3} < 2.0 \qquad (3)$$

where $L_2$ is the movement amount of the second lens unit and $L_3$ is the movement amount of the third lens unit.

The condition (3) defines the range where the balance between the movement amounts of the second and third lens units is excellent. If the total length of the objective system is determined so that the condition (3) is fulfilled, the objective system is incorporated compactly in the camera. When the lower limit of the condition (3) is exceeded, the movement amount of the second lens unit decreases. However, since the movement amount of the third lens unit increases, the total length of the objective lens increases. When the upper limit of the condition (3) is exceeded, the movement amount of the third lens unit decreases. However, since the movement amount of the second lens unit increases, the total length of the objective system increases.

As described previously, in the conventional real-image finders, if the zoom ratio is increased, the lens movement amount in zooming increases, so that the total length of the objective system increases. As a result, a compact finder cannot be realized. If the lens movement amount is decreased by increasing the power of each unit to realize a compact finder, aberrations deteriorate and the sensitivity to work errors increases. If the sensitivity to work errors increases, it is difficult to manufacture the finder within a permissible error range.

However, the work errors of the first and fourth lens units which are highly sensitive to work errors because of their strong power as described previously are easily restrained to be within the permissible range by making them stationary during zooming. This is effective particularly in preventing parallax. Moreover, since zooming is performed by moving the second and third lens units having a low sensitivity to work errors, the work errors of the movable lens units used for zooming are no obstacle to the manufacture of the finder.

Further, the present invention employs the four-unit system of positive, negative, negative, positive configuration where it is easy to correct aberrations excellently. Therefore, although a considerable high zoom ratio of 2.5× to a little less than 6× is realized, aberrations are corrected much more excellent, for example, than the finder having a three-unit objective system of positive, negative, positive configuration.

As described above, according to the lens system of the present invention, a high zoom ratio is realized with aberrations being corrected excellently, and the total length of the first to fourth lens units constituting the objective system is decreased to realize a compact finder. As a result, the use of the finder of the present invention reduces the thickness of the lens shutter camera.

Further, since the objective system of the present invention is arranged so that the second and third lens units move toward the object side during zooming to a shorter focal length condition and toward the finder exit pupil side during zooming to a longer focal length side, when it is employed in a camera provided with a zoom strobe, the driving mechanism for moving the second or the third lens unit is used also as the strobe driving mechanism to move the strobe integrally with the second or the third lens unit. Since the number of parts is reduced by using the driving mechanism for the two purposes, the reduction in cost of the camera and the saving of the space in the camera are achieved. The specific arrangement will be described later with reference to an embodiment shown in FIG. 1.

Onto the objective system side of an objective image plane formed by the objective system (formed in the vicinity of the field frame SF in the embodiments described later), a virtual aperture surface (i.e. finder entrance pupil) conjugate with the finder exit pupil is projected by the eyepiece system. To reduce the size of the objective system along the diameter thereof, it is necessary to reduce the size along diameters of the first and fourth lens units having large diameters. The farther the lens units are from the virtual aperture surface, the larger the diameters of the lens units are. Therefore, by locating the first and fourth lens units substantially at the same distance away from the virtual aperture surface, the diameters of the first and fourth lens units are both minimum. Therefore, by making the diameters of the first and fourth lens units substantially the same by locating the virtual aperture surface substantially in the center of the objective system (i.e. substantially midway between the first and fourth lens units) by regulating the power of the condenser lens arranged in the vicinity of the objective image plane, the size of the objective system is reduced along the diameters of the lens units.

Since the light other than the light to be incident on the eye causes finder ghost, the finder is normally provided with a member for effectively cutting off this unnecessary light (this member will hereinafter be referred to as "luminous flux restricting member"). In the present invention, the luminous flux restricting member is preferably arranged at the position of the virtual aperture surface where the lens effective aperture is minimum. The reason therefor is as follows: the farther a lens is away from the virtual aperture, the larger the effective aperture of the lens is, and when the luminous flux restricting member is arranged where the effective aperture of the lens is large, the unnecessary luminous flux cannot be effectively cut off and the size of the finder increases as the size of the luminous flux restricting member increases.

However, when the virtual aperture surface is located substantially in the center of the objective system as described above, it is impossible to fix the luminous flux restricting member at the position of the virtual aperture surface so as not to interfere with the second and third lens units. This is because the second and third lens units both pass the position of the virtual aperture surface in the entire zoom range. Therefore, by locating the luminous flux restricting member between the second and third lens units so as not to interfere with them and to be closest to the virtual aperture surface according to the zooming condition, the luminous flux restricting member functions most effectively. To do so, however, a mechanism is required to drive the luminous flux restricting member. The addition of such a driving mechanism increases the number of parts, so that the cost and size of the camera increase.

For this reason, when the virtual aperture surface is located substantially in the center of the objective system in the present invention, it is preferable to provide the luminous flux restricting member to a holder for the second lens unit or to a holder for the third lens unit. The luminous flux restricting member provided to the holder can be located close to the virtual aperture surface (i.e. can be located so as not to be far away from the virtual aperture surface) in the entire zoom range. It is preferable to provide the luminous flux restricting member to the third lens unit side of the holder of the second lens unit or to the second lens unit side of the holder of the third lens unit since the luminous flux restricting member can be located closer to the virtual aperture surface. The luminous flux restricting member may be provided to the first lens unit side of the holder of the second lens unit or to the fourth lens unit side of the holder of the third lens unit. The specific arrangement will be described with reference to the embodiment of FIG. 1.

By providing the luminous flux restricting member as described above, the unnecessary light is effectively cut off in the entire zoom range. This is very effective in preventing finder ghost. In addition, since the deterioration of aberrations due to the unnecessary light is prevented by the restriction of the light, the aberration performance improves. Moreover, since no mechanism is required to drive the luminous flux restricting member provided to the holder of the second or third lens unit, the size and cost of the camera are not increased by the addition of the luminous flux restricting member.

Preferably, an aspherical surface is provided at least in the fourth lens unit. In the objective system according to the present invention, for aberration correction in the entire zoom range, it is preferable to provide at least in the fourth lens unit an aspherical surface having a curvature which decreases from the center to the edge along the radius. Providing such an aspherical surface in the fourth lens unit having a positive power is effective particularly in correcting astigmatism and field curvature. Likewise, it is effective to provide in the first lens unit having a positive power an aspherical surface having a curvature which decreases from the center to the edge along the radius. Thereby, spherical aberration at the longest focal length condition is excellently corrected.

Moreover, it is preferable that the second lens unit includes a negative lens element strongly concave to the image side and that the third lens unit includes a negative lens element strongly concave to the object side. By fulfilling these conditions, aberrations are excellently corrected in the entire zoom range particularly in a zoom system realizing a zoom ratio of 4× or higher. Further, the fulfillment of the conditions is very effective particularly in reducing variation in astigmatism and field curvature caused by zooming.

Hereinafter, embodiments of the present invention will be described. Tables 1, 5, 9, 13 and 17 show the optical system data of first to fifth embodiments of the present invention, respectively. In the tables, surface No. is the number of the surface counted from the object side, CR is the radius of curvature of the surface, and T is the axial distance. Ne and ve are the refractive index and the Abbe number to the e-line of the lens, respectively. ω is the half view angle, and Γ is the finder magnification.

In the optical system data of the embodiments shown in Tables 1, 5, 9, 13 and 17, the surfaces marked with * are aspherical and defined by the following expression representative of the aspherical surface configuration:

$$X = \frac{C_0 Y^2}{1 + (1 - \epsilon C_0^2 Y^2)^{1/2}} + \sum_i Ai|Y|^i$$

where X is a deviation amount from a reference surface along the optical axis, Y is a height in a direction perpendicular to the optical axis, ε is a conic constant, $C_O$ is a curvature (inverse number of the radius of curvature) of a spherical surface serving as a reference for the aspherical surface, and Ai is an ith aspherical coefficient. Data on the aspherical surface of the first to fifth embodiments are shown in Tables 2, 6, 10, 14 and 18, respectively.

Tables 3, 7, 11, 15 and 19 show the finder magnification Γ and the variation in axial distance caused by zooming in the first to fifth embodiments, respectively. Tables 4, 8, 12, 16 and 20 show values of the first to fifth embodiments for conditions (1) to (3).

FIGS. 2, 4, 6, 8 and 10 show the arrangements of the optical systems of the first to fifth embodiments, respectively. The optical arrangements at the shortest focal length condition (Wide), at the middle focal length condition and at the longest focal length condition (Tele) are shown. The lines m2 and m3 in the figures schematically show the movements of second and third lens elements G2 and G3 from the shortest to the middle focal length conditions. The lines M2 and M3 in the figures schematically show the movements of the second and third lens elements G2 and G3 from the middle to the longest focal length conditions. In the figures, ri (i=1,2,3, . . . ) represents an ith surface (surface number=i) from the object side, and di (i=1,2,3, . . . ) represents an ith axial distance from the object side. In the above-mentioned tables, a field frame (field stop) SF is not shown.

The embodiments are all real-image finders each including an objective system, an eyepiece system for observing a subject image formed by the objective system while enlarging it, and an image erecting system for erecting the subject image into an erect image.

The objective system comprises a first lens unit including a first lens element G1 having a positive power, a second lens unit including the second lens element G2 having a negative power, a third lens unit including the third lens element G3 having a negative power, and a fourth lens unit including a fourth lens element G4 having a negative power and a roof prism DP (first to third embodiments) or only the fourth lens element G4 (fourth and fifth embodiments). The fourth lens element G4 and the roof prism DP may be integrated, for example, into a roof prism having a surface convex to the subject side.

The image erecting system is constituted by the roof prism of the fourth lens unit and a penta prism PP in the first to the third embodiments, and by a non-illustrated roof mirror and the penta prism PP in the fourth and fifth embodiments. Needless to say that an image erecting system constituted by a Porro prism may be used instead of the roof prism DP or the roof mirror and the penta prism PP. The field frame SF is arranged on the subject side of the roof prism DP. The objective system forms a subject image at the position of the field frame SF (at the vertex of a condenser lens surface CS).

The eyepiece system is constituted by the penta prism PP and an eyepiece GE. The subject side convex surface of the penta prism PP forms the condenser lens surface CS.

The first and third embodiments comprise from the object side a first lens element G1 which is a bi-convex lens having a positive power, a second lens element G2 which is a bi-concave lens having a negative power, a third lens element G3 which is a bi-concave lens having a negative power, a fourth lens element G4 which is a bi-convex lens having a positive power, a roof prism DP whose both side surfaces are plane, a field frame SF, a penta prism PP convex to the object side and whose finder exit pupil side surface is plane, and an eyepiece GE which is a bi-convex lens. The following surfaces are aspherical: the finder exit pupil side surface of the first lens element G1, the finder exit pupil side surface of the second lens element G2, both side surfaces of the fourth lens element G4, and the finder exit pupil side surface of the eyepiece GE.

The second embodiment comprises from the object side a first lens element G1 which is a bi-convex lens having a positive power, a second lens element G2 which is a bi-concave lens having a negative power, a third lens element G3 which is a negative meniscus lens concave to the object side, a fourth lens element G4 which is a bi-convex lens having a positive power, a roof prism DP whose both side surfaces are plane, a field frame SF, a penta prism PP convex to the object side and whose finder exit pupil side surface is plane, and an eyepieces GE which is a bi-convex lens. The following surfaces are aspherical: the finder exit pupil side surface of the first lens element G1, the finder exit pupil side surface of the second lens element G2, both side surfaces of the fourth lens element G4, and the finder exit pupil side surface of the eyepiece GE.

The fourth and fifth embodiments comprise from the object side a first lens element G1 which is a bi-convex lens having a positive power, a second lens element G2 which is a bi-concave lens having a negative power, a third lens unit G3 which is a bi-concave lens having a negative power, a fourth lens element G4 which is a bi-concave lens having a positive power, a field frame SF, a roof mirror (not shown), a penta prism PP convex to the object side and whose finder exit pupil side surface is plane, and an eyepiece GE which is a bi-convex lens. The following surfaces are aspherical: the finder exit pupil side surface of the first lens element G1, the finder exit pupil side surface of the second lens element G2, both side surfaces of the fourth lens element G4, and the finder exit pupil side surface of the eyepiece GE.

FIGS. 3A to 3C, 5A to 5C, 7A to 7C, 9A to 9C and 11A to 11C show aberration curves of the first-to fifth embodiments at the shortest focal length condition. FIGS. 3D to 3F, 5D to 5F, 7D to 7F, 9D to 9F and 1Id to 11F show aberration curves of the first to fifth embodiments at the middle focal length condition. FIGS. 3G to 3I, 5G to 5I, 7G to 7I, 9G to 9I and 11G to 11I show aberration curves of the first to fifth embodiments at the longest focal length condition. In the figures, h represents an exit pupil height, and the solid lines show aberrations to the e-line. The solid lines DS and the alternate long and short dash lines DT represent astigmatisms at the sagittal and tangential surfaces, respectively.

The optical system data of the embodiments show that the total length of the objective system is small. Moreover, the representations of aberration show that the aberrations are excellently corrected although high zoom ratios are realized (the zoom ratio is approximately 2.5× in the first embodiment, approximately 3.3× in the second embodiment, approximately 3.5× in the third embodiment, approximately 4.7× in the fourth embodiment, and approximately 5.6× in the fifth embodiment).

FIG. 1 cross-sectionally shows the first embodiment incorporated in a camera body. The solid line shows the position of each element at the shortest focal length condition. The broken line shows the position of each element at the longest focal length condition. Subject light coming through a finder window 21 into a camera body 20 is directed to the pupil of the photographer by way of the objective system (first to fourth lens elements G1 to G4), the roof prism DP, the penta prism PP and the eyepieces GE.

According to the optical arrangement of the first embodiment, by the powers of the condenser lens surface CS of the penta prism PP and the eyepiece GE, the virtual aperture surface is located substantially in the center of the objective system (depending on the zooming condition, the position of the virtual aperture surface is slightly varied by the movable lens units). In other words, the virtual aperture surface is located on the fourth lens element side of the third lens element G3 at the shortest focal length condition (solid line) and on the first lens element side of the second lens element G2 at the longest focal length condition (broken line). By adjusting the position of the virtual aperture surface as described above so that the diameters of the first and fourth lens units are the same, the size of the objective system along the diameter of each lens unit is made minimum.

In the finder shown in FIG. 1, since a flare stop S2 functioning as the luminous flux restricting member is integrated with a second unit holder H2 (on the third lens element side of the second lens element G2), the flare stop S2 moves in the entire zoom range while keeping close to the virtual aperture surface. Thereby, the finder luminous flux is restricted at a position where the effective aperture of the lens is minimum.

Generally, a zoom strobe for a camera is designed so that a strobe unit moves toward the subject side during zooming to a shorter focal length condition and toward the finder exit pupil side during zooming to a longer focal length condition. This coincides with the directions of movements of the second and third lens units during zooming in the optical arrangement of the present invention. Therefore, it is possible to move them integrally.

To move the strobe unit independently of the finder, a member is necessary which transmits a force in correspondence with the zooming of a taking system (not shown). However, since normally, the strobe is frequently arranged at a left or right upper end of the camera, the addition of a transmission mechanism for transmitting a force to the position requires additional space and parts, which results in an increase in size and cost of the camera.

In the camera shown in FIG. 1, a zoom strobe unit ZS integrated with a third unit holder H3 is used; when the third lens element G3 moves during zooming, the zoom strobe unit ZS also moves integrally therewith to perform strobe zooming. A strobe window 22 constituted by a Fresnel lens condenses the strobe light emitted from the zoom strobe unit ZS. The zoom strobe unit ZS moves toward the subject side as the focal length decreases, since the greater the distance between the strobe window 22 and the zoom strobe unit ZS is, the more the strobe light is stopped. By moving the strobe unit integrally with the movable lens unit of the finder as described above, the number of parts can be reduced. As a result, the cost and necessary space are decreased.

The relationship between the movement amounts of the third unit holder H3 and the zoom strobe unit ZS is decided by adjusting the power of the Fresnel lens constituting the strobe window 22, by adjusting the configuration of a reflector (not shown) of the zoom strobe unit ZS and by adjusting the ratio between the movement amounts of the second and third lenses G2 and G3.

As mentioned previously, normally, the strobe is frequently arranged in a left or right upper end of the camera. When the finder and the zoom strobe unit ZS are incorporated in the camera as shown in FIG. 1, a small space surrounded by the camera body 20 and the penta prism PP is created in the rear of the zoom strobe unit ZS. This space is apt to be a dead space according to its size and location.

In the camera shown in FIG. 1, a part of the finder (i.e. the penta prism PP) and a photometric optical system are arranged in the space so that no dead space is left. The photometric optical system performs photometry by using a part of the finder luminous flux having passed through a semitransparent luminous flux processing surface PS which is a first reflecting surface of the penta prism PP. The light having passed through the semitransparent luminous flux processing surface PS is directed to a photometric lens 11 and then directed to a photometric device 13 through a photometric aperture 12 arranged in the rear of the photometric lens 11. Thus, by using a part of the finder luminous flux for photometry, photometry is stably performed in accordance with the variation in angle of view caused by zooming.

Between the photometric lens 11 and the photometric device 13, the photometric aperture 12 is arranged. Since the photometric luminous flux is restricted by the photometric aperture 12, the diameter of the luminous flux incident on the photometric device 13 is constant irrespective of the zooming condition of the finder. As a result, the output of the device 13 is constant in the entire zoom range for subjects of the same luminance. Specifically, since the f-number varies when zooming is performed with respect to subjects of the same luminance, the output of the photometric device 13 varies according to the zooming condition. However, since the f-number of the photometric optical system can be made always constant by the photometric aperture 12, it is unnecessary to adjust the output value for the subject luminance for every zooming condition.

As described above, with the arrangement shown in FIG. 1, the space in the rear of the zoom strobe unit ZS is efficiently used, and photometry is performed stably and highly accurately. While the photometric optical system is arranged in the space in this embodiment, the space is efficiently used similarly when, instead of the photometric optical system, a focus detecting optical system which is also used as the objective system, or a projecting optical system for displaying finder information is arranged. As the focus detecting optical system, for example, an autofocus (AF) module for phase difference detection type (passive type) and a light receiver for infrared ray type (active type).

Figure 12:
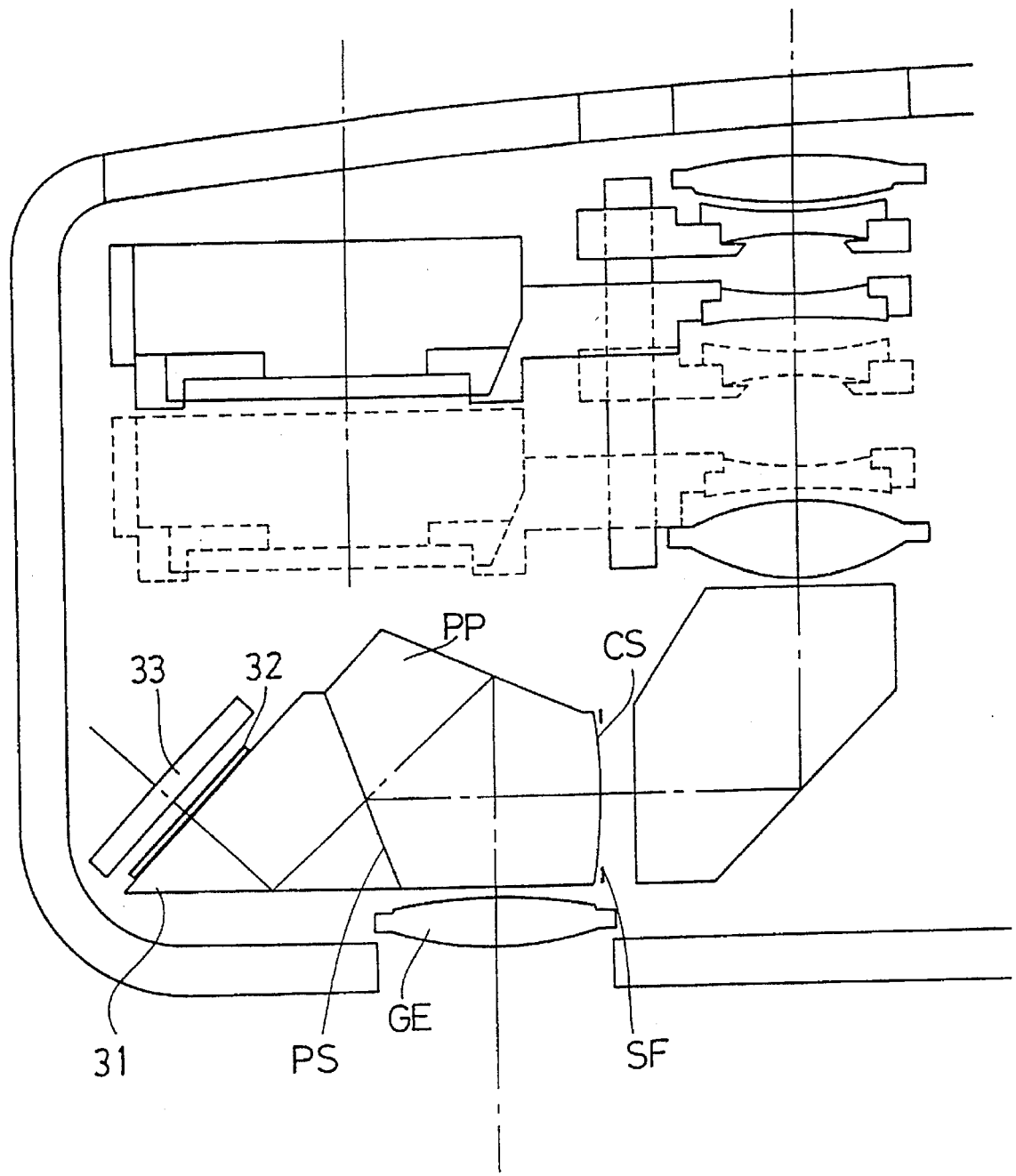
FIG. 12 is a cross-sectional view showing the first embodiment of the present invention incorporated in the camera body together with a projecting optical system.

FIG. 12 cross-sectionally shows an arrangement in which the projecting optical system for displaying finder information is provided inside the camera body instead of the photometric optical system. The arrangement of FIG. 12 is the same as that of FIG. 1 except that the projecting optical system is provided instead of the photometric optical system. The projecting optical system comprises a display system prism 31 made of the same material as that of the penta prism PP, a display member 32 and a lighting member 33. As the display member 32, a liquid crystal display (LCD) device, printing and deposition may be used. As the lighting member 33, a light emitting device such as a light emitting diode (LED) and an electroluminescence (EL) device may be used. The display member 32 displays finder information such as a shutter speed, an AF mark, an AF area and an f-number.

The display member 32 is arranged at a position which is away from the semitransparent luminous flux processing surface PS by the optical path length from the objective image plane on which a subject image is formed to the semitransparent luminous flux processing surface PS. The display surface of the display member 33 bears a conjugate position relationship with the objective image plane located in the vicinity of the field frame SF. The display member 32 is irradiated by the lighting member 33 from the rear side, and the irradiation light is made incident on the semitransparent luminous flux processing surface PS through the display system prism 31. Then, since the angle of incidence of the irradiation light to the semitransparent luminous flux processing surface PS is regulated so that the light traces the same optical path as that of the finder luminous flux from the objective system to be incident on the eyepiece GE, the light entering the penta prism PP is directed to the eyepiece 7 together with the finder luminous flux from the objective system. Thus, with the arrangement shown in FIG. 12, finder information is displayed by efficiently using the space in the rear of the zoom strobe unit ZS.

As described above, according to the real-image finder of the present invention, since it comprises from the object side a first lens unit having a positive power, a second lens unit having a negative power, a third lens unit having a negative power and a fourth lens unit having a positive power, aberrations are excellently corrected although a high zoom ratio of approximately 2.5 to 6× is realized. Since zooming is performed by moving the second and third lens units always in the same direction, a compact high-zoom-ratio real-image finder is realized where the total length of the objective lens is small.

In such an arrangement, by making stationary the first and fourth lens units which are highly sensitive to work errors, a finder is realized where work errors are suppressed easily. This is particularly effective in suppressing parallax.

Since the movable lens units are moved always in one direction in zooming, it is possible to move the zoom strobe integrally with the second or the third lens unit by using the driving mechanism for the second or the third lens unit also for the zoom strobe. Since the number of parts is reduced by using the driving mechanism for the two purposes, the cost and size of the camera are reduced.

Generally, an unnecessary space is apt to be created in the rear of the strobe of the camera. According to the present invention, the space is efficiently used by arranging a part of the finder therein, or by arranging a photometric optical system or a distance measuring optical system or a finder information display therein. As a result, the size of the camera is reduced. For example, by using a part of the finder luminous flux from the objective system for the photometric optical system, photometric is performed stably and highly accurately.

Figure 13:
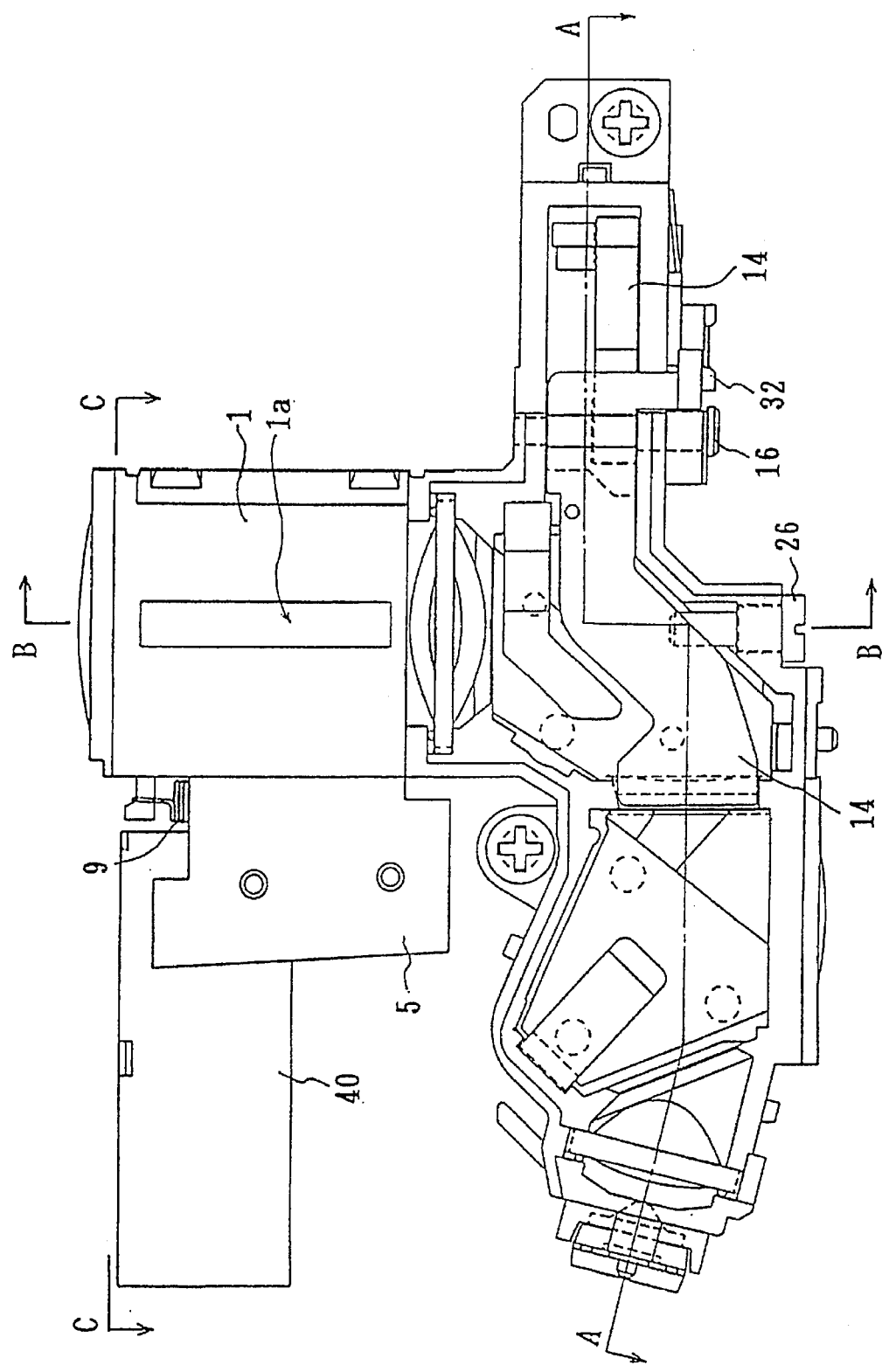
FIG. 13 is an upper view showing a finder block incorporating an embodiment of the present invention.
Figure 14:
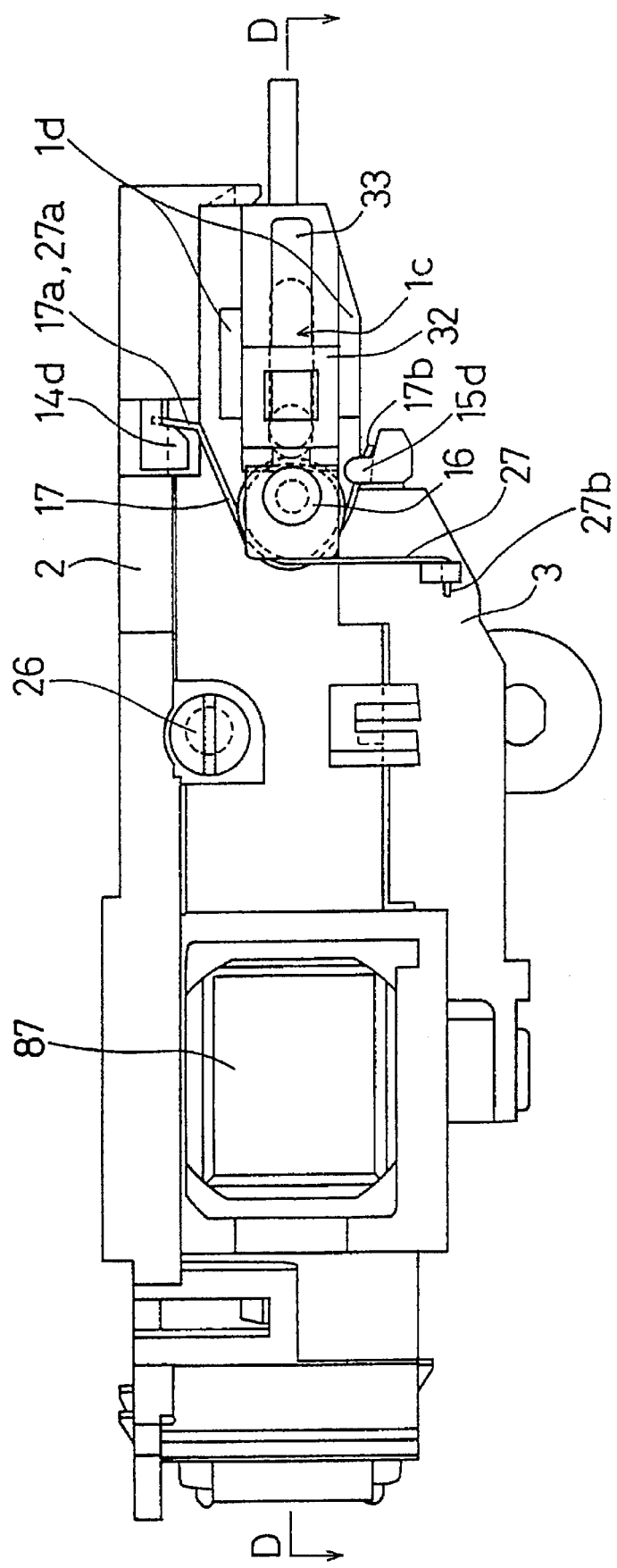
FIG. 14 shows the finder block of FIG. 13 viewed from the side of an eyepiece.
Figure 21:
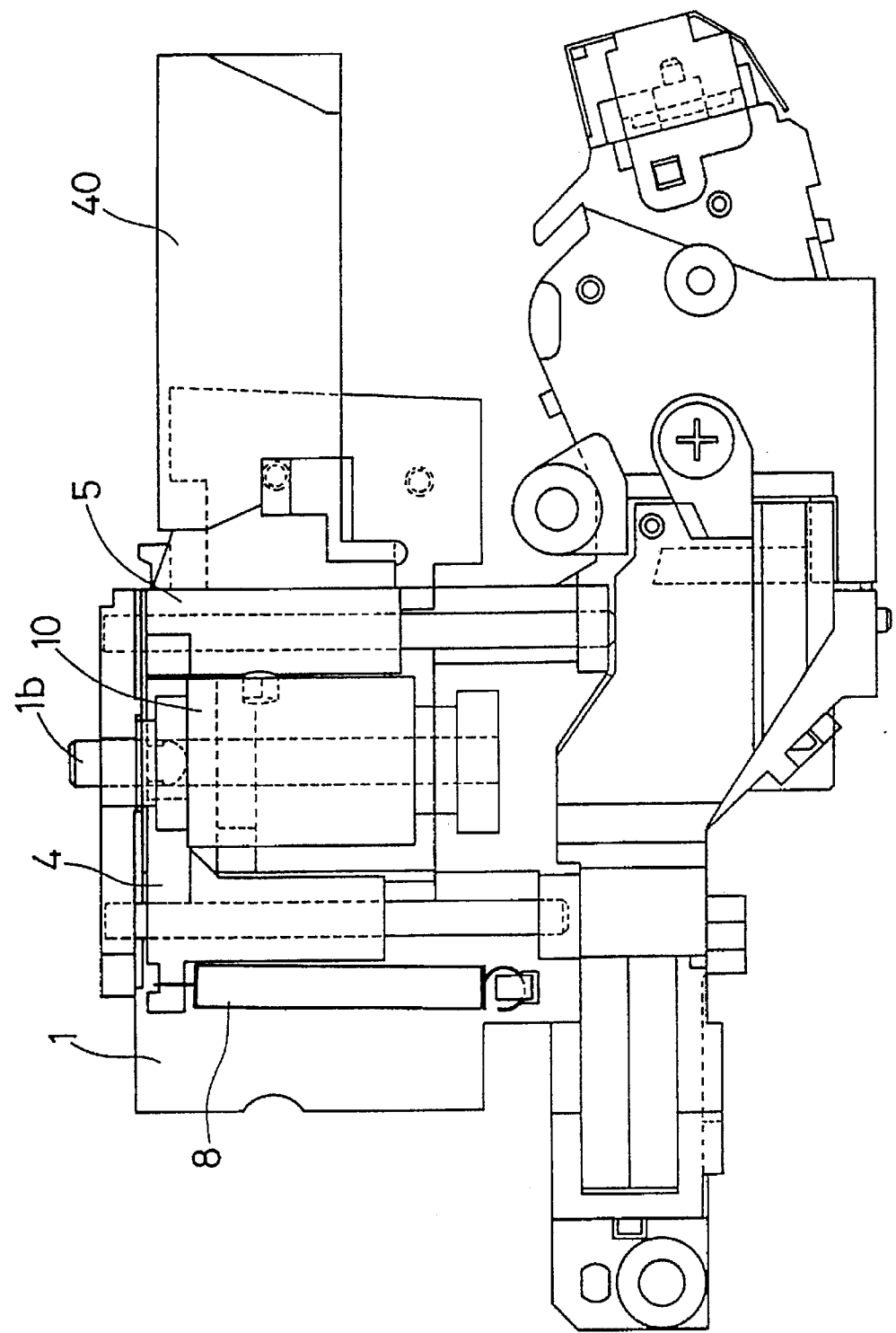
FIG. 21 is a bottom view of the finder block of FIG. 13.

Hereinafter, another embodiment of the present invention will be described. This embodiment is a finder frame changeover mechanism. FIGS. 13, 14 and 21 show a finder block viewed from the upper surface side, the eyepiece side and the bottom surface side, respectively. FIGS. 15, 17, 18 and 19 are cross-sectional views taken on line A—A of FIG. 13, on line D—D of FIG. 14, on line B—B of FIG. 13 and on line C—C of FIG. 13, respectively.

The finder field frame changeover mechanism is provided with a movable field frame which restricts the finder field by blocking a part of the optical path in the vicinity of the image plane of a real-image finder. The finder field frame changeover mechanism changes the finder field in a camera capable of changeover between normal photographing and panoramic photographing. The movable field frame is constituted by subsequently described wings 14 and 15. When the movable field frame is retreated from the image plane portion (the space between a prism 85 and a prism 86) of the finder, a subsequently-described stationary field frame 25 blocks the optical path to restrict the finder field to the one for normal photographing. When the movable field frame is in the image plane portion, it blocks a part of the optical system from the upper and lower sides to change the finder frame for normal photographing to the one for panoramic photographing. This embodiment is characterized in that a part of the optical path is blocked by the rotation of the movable field frame so that the center of rotation is located parallel to the image plane and away from the image plane.

Figure 17:
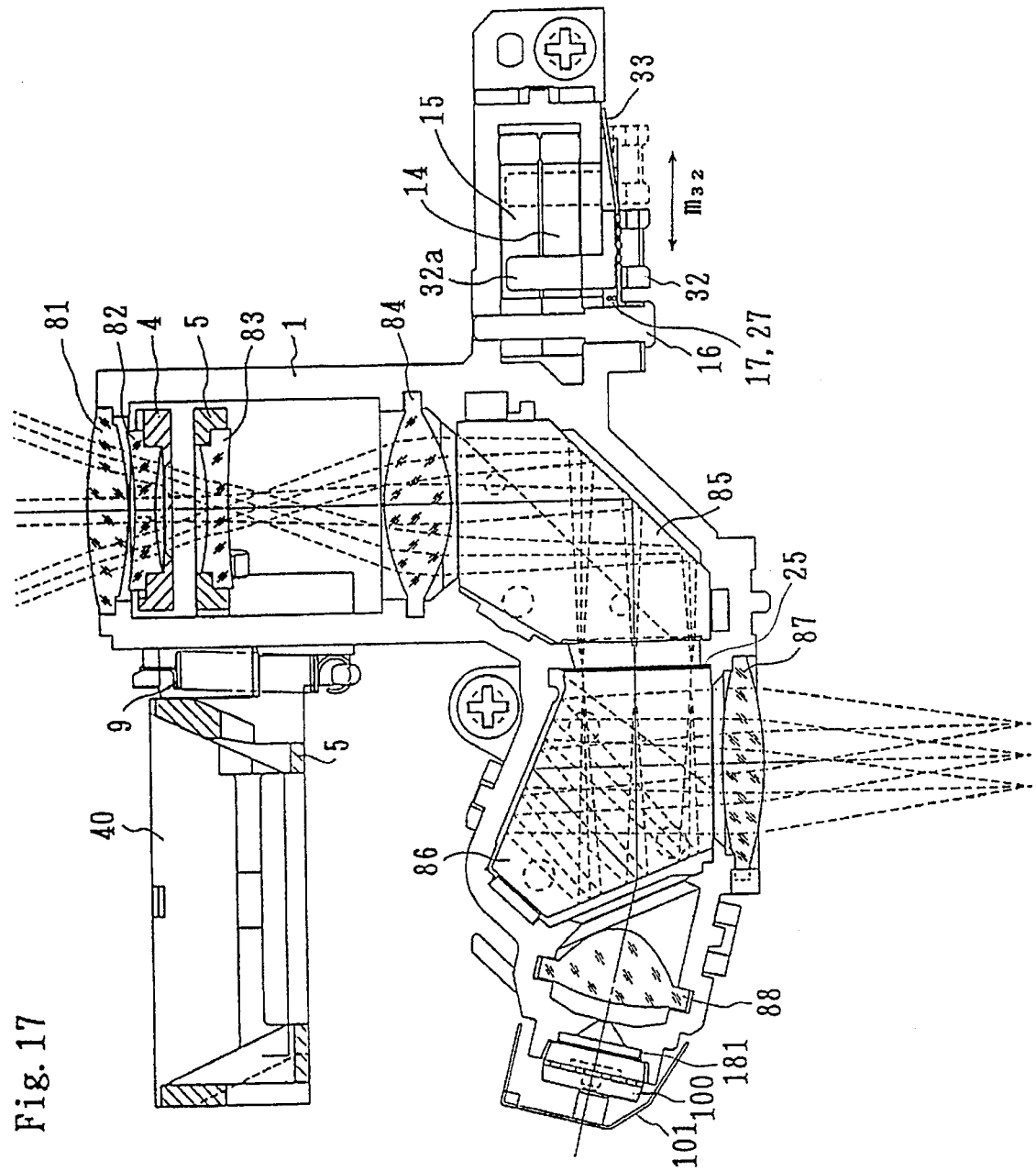
FIG. 17 is a cross-sectional view taken on line D—D of FIG. 14.
Figure 18:
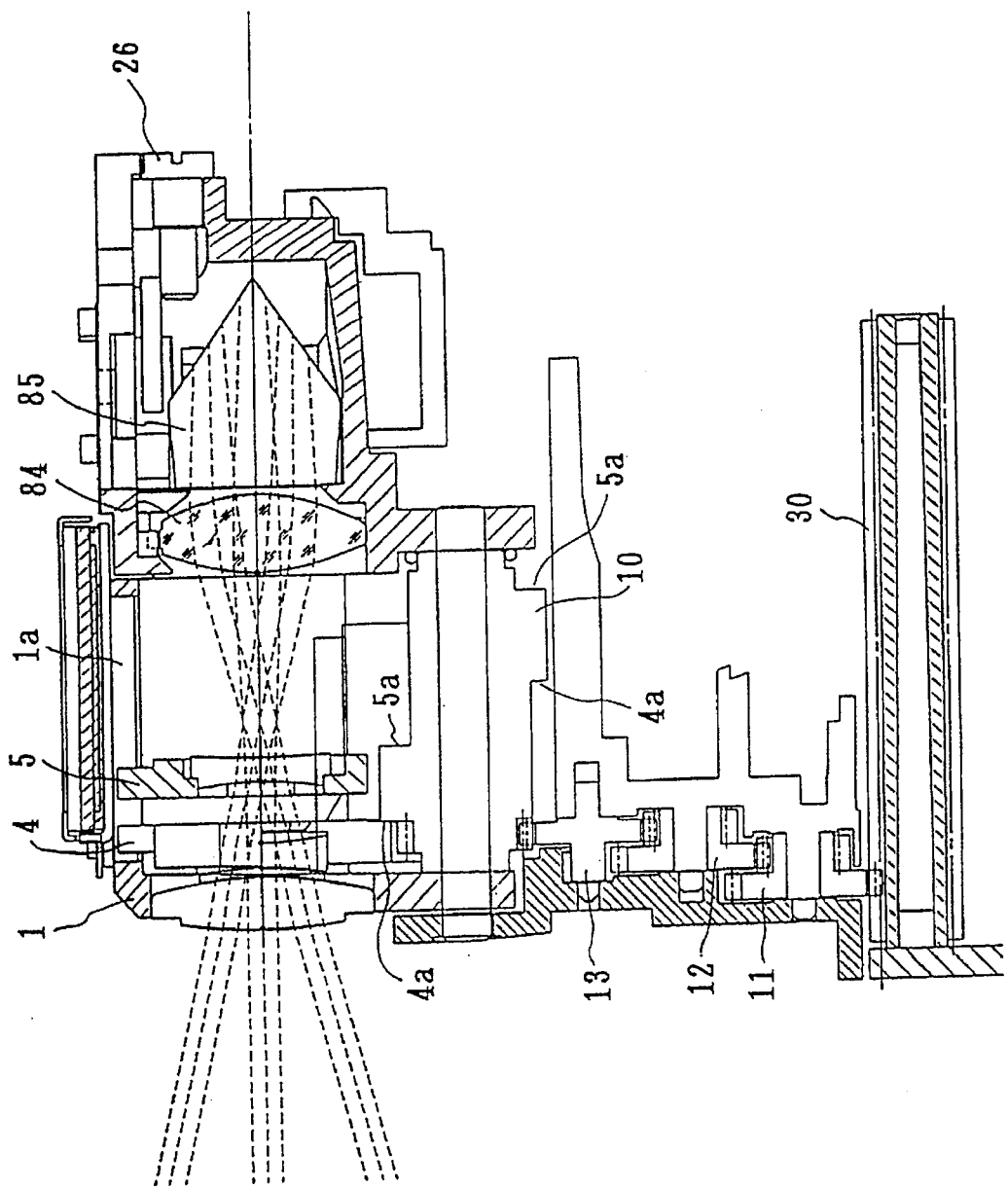
FIG. 18 is a cross-sectional view taken on line B—B of FIG. 13.

First, the mechanism of the finder block will be described. As shown in FIG. 17, the optical system constituting the finder comprises, from the object side, lens elements 81, 82, 83 and 84 and a prism 85 which constitute an objective system, and a prism 86 and a lens element 87 which constitute an eyepiece system. Of the elements, the lens elements 81, 84 and 87 and the prisms 85 and 86 are fixed in a holder 1. A lens 88 for through the finder (TTF) photometry, a filter 181 and a device 100 are also arranged in the holder 1. The device 100 is covered with a shielding plate 101.

Figure 15:
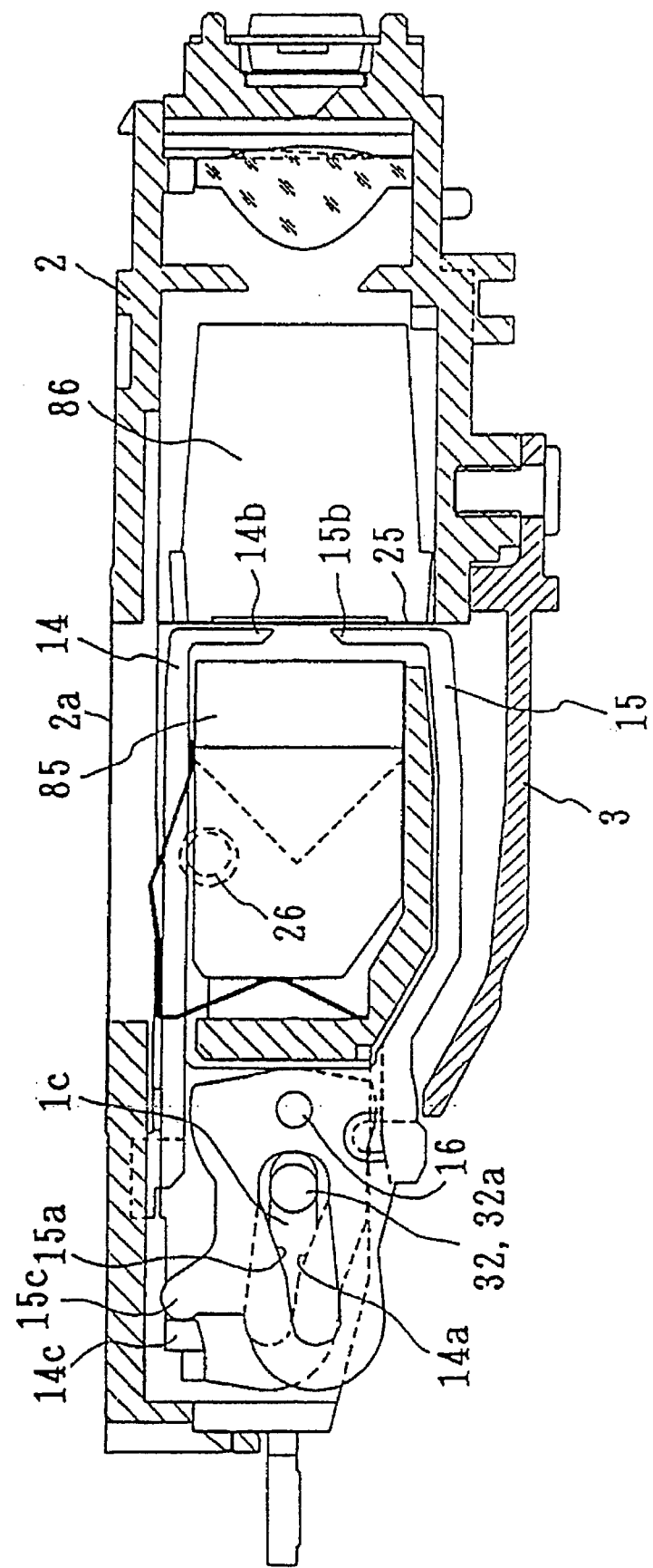
FIG. 15 is a cross-sectional view taken on line A—A of FIG. 13.

Although not shown in FIG. 13, as shown in FIG. 15, a cover 2 and a sheet 2a for dust prevention and light interception are provided above the optical system, and a cover 3 is provided below the optical system. The sheet 2a is provided to cover only a part of the finder block in order to secure a space into which the wing 14 retreats. Since the use of the cover 2 formed so that the wing 14 can retreat from the image plane without abutting it increases the size of the finder block, the sheet 2a thinner than the cover 2 is used.

Figure 19:
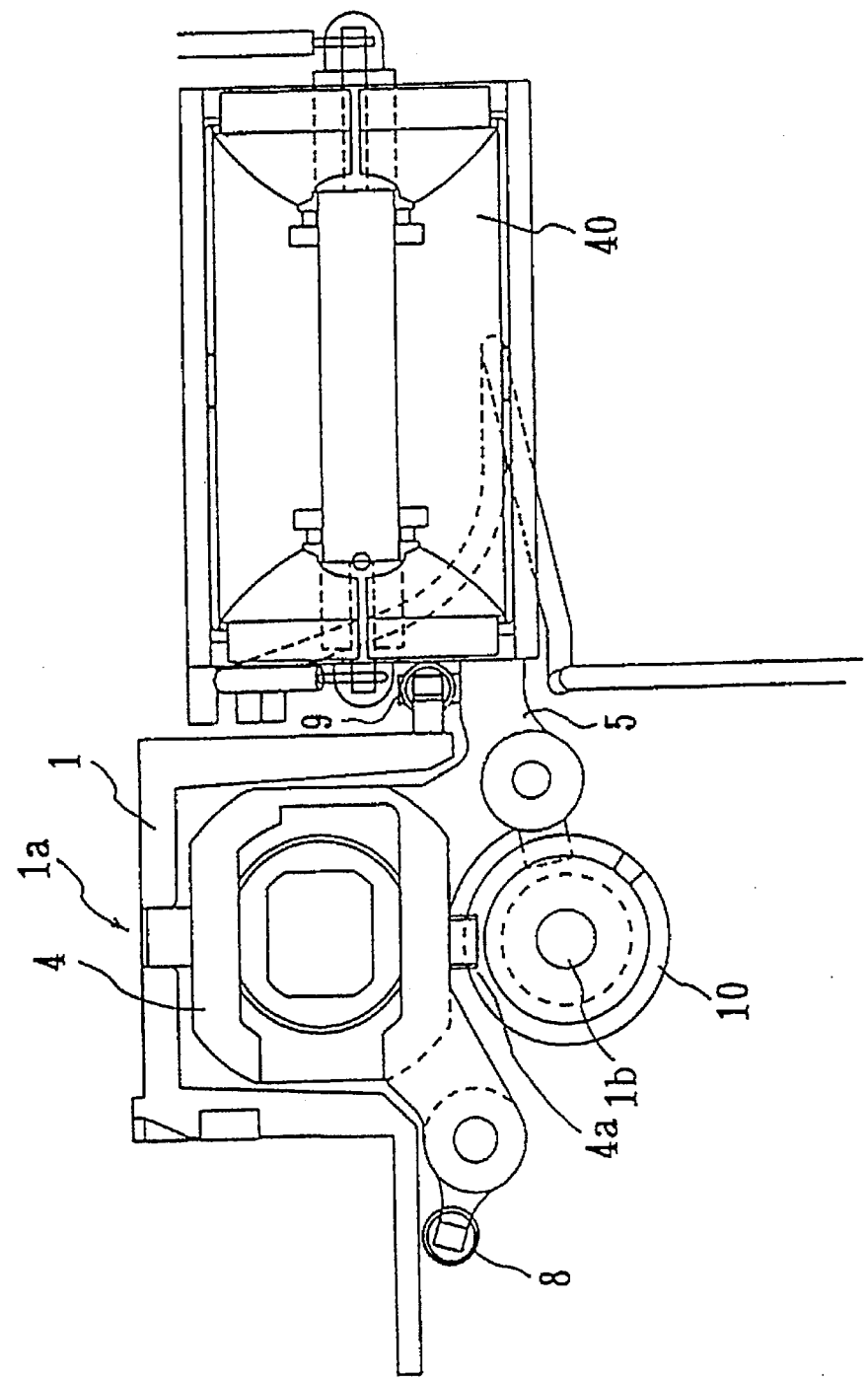
FIG. 19 is a cross-sectional view taken on line C—C of FIG. 13.
Figure 20:
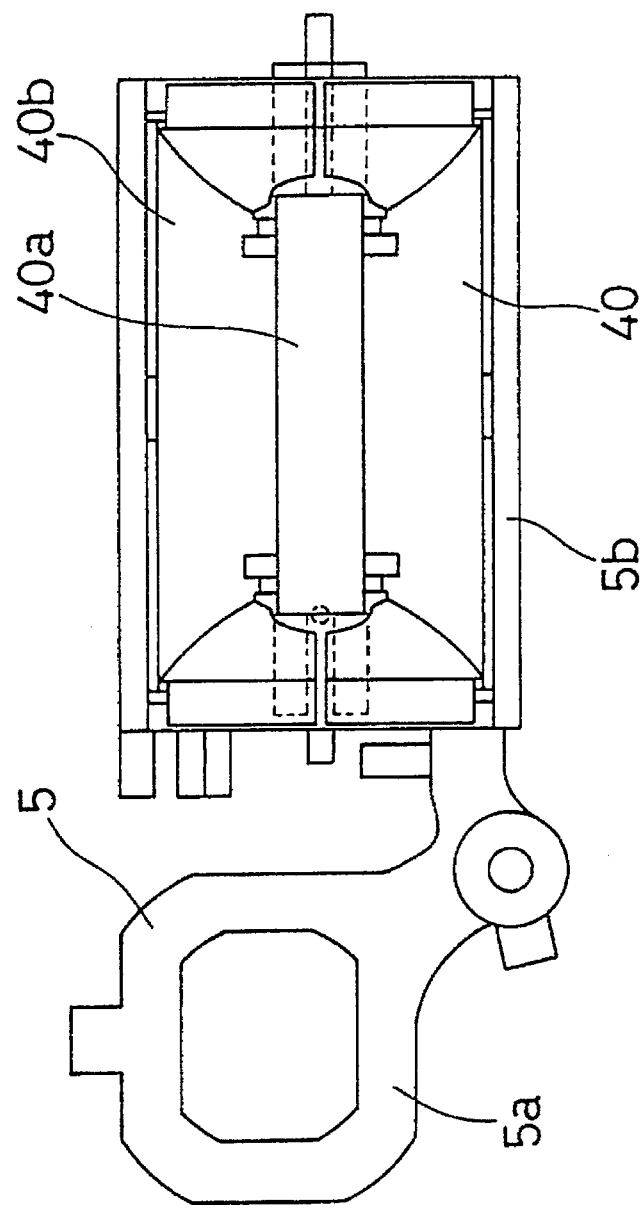
FIG. 20 shows the attachment conditions of a xenon tube and a reflector relative to a holer 5 in the arrangement of FIG. 19.

The lens elements 82 and 83 (FIG. 17) are fixed to holders 4 and 5, respectively. As shown in FIGS. 19 and 21, the holders 4 and 5 are movable along an axis 1b fixed to the holder 1, and a follower groove 1a shown in FIG. 13. The holders 4 and 5 are pressed against a circular cum 10 by springs 8 and 9 as shown in FIG. 19. For this reason, when the circular cum 10 is rotated by the driving force transmitted from the taking optical system through gears 30, 11, 12 and 13 shown in FIG. 18, the holders 4 and 5 move backward and forward along cum surfaces 4a and 5a shown in FIGS. 18 and 19. By moving the holders 4 and 5 backward and forward in this manner, zooming of the finder is performed. The holder 5 is constituted by a lens holder 5a for holding the lens element 83 (see FIG. 17) and a flash holder 5b for holding a xenon tube 40a as shown in FIG. 20. Since a strobe 40 and the lens element 83 are integrated by the holder 5, zooming of the strobe 40 is performed without using any interlocking mechanism.

Subsequently, the finder field frame changeover mechanism will be described. As described previously, this embodiment is for use in a camera capable of changeover between normal photographing and panoramic photographing. Since the image plane is formed at the position of the incident surface (prism 85 side surface) of the prism 86 as is apparent from the optical paths shown in FIG. 15, the finder field for normal photographing is restricted by the stationary field frame 25 of sheet form attached to the incident surface of the prism 86. For panoramic photographing, the wings 14 and 15 intercept light beams passing through the upper and lower portions of the normal photographing finder field to restrict the finder field. The driving source for driving the wings 14 and 15 when the finder field is changed over in this manner is not the taking optical system and interlocking image frame but an operation member not shown in this embodiment. That is, the photographer directly operates the operation member to make the changeover between normal photographing and panoramic photographing.

As shown in FIG. 15, both the wings 14 and 15 use a pin 16 as the axis of rotation. The changeover between normal photographing and panoramic photographing is made by the rotation of the wings 14 and 15 about the pin 16. By using the pin 16 as the axis of rotation for both the wings 14 and 15, the finder field is restricted with a high positional accuracy.

The above-mentioned non-illustrated operation member is coupled to an interlocking pin 32 shown in FIGS. 14 and 15. The interlocking pin 32 is in contact with cum surfaces 14a and 15a at its cylindrical abutting portion 32a. The portion where the cum surfaces 14a and 15a are formed serves as a driving force inputter which transmits the driving force to move tips 14b and 15b of the wings 14 and 15.

Unless a driving source is provided within the finder block, it is necessary to input the driving force to the wings 14 and 15 from the outside of the finder block. Therefore, although the finder block is closed in the vicinity of the image plane by the covers 2 and 3 and the sheet 2a for dust prevention, there inevitably exists a place where the closed condition is broken for connection with the outside of the finder block. A hole 1c (see FIG. 15) formed to be long and narrow in the holder 1 and into which the interlocking pin 32 is inserted corresponds to the place. There is a possibility that dust intrudes into the finder block through the hole 1c. However, since the hole 1c is located away from the image plane by locating the pin 16 away from the image plane, even if dust intrudes through the hole 1c, it is difficult for the dust to intrude as far as the vicinity of the image plane. Further, since the prism 85 is arranged between the hole 1c and the image plane, the intrusion of dust to the vicinity of the image plane is prevented more effectively.

The abutting portion 32a moves in a direction perpendicular to the pin 16 (in the direction of arrow $m_{32}$) as shown in FIG. 17 by being guided by the hole 1c formed in the holder 1. The interlocking pin 32 moves (in the direction of arrow $m_{32}$) as shown in FIG. 17 by being guided by a concave 1d formed in the holder 1 (FIG. 13) as shown in FIG. 14 from the upper side and the lower side. A spring 33 shown in FIGS. 14 and 17 which is inserted through the interlocking pin 32 presses the interlocking pin 32 against the holder 1 by the pin 16 being held in the holder 1. The spring 33 also functions to prevent springs 17 and 27 from coming out.

Figure 16:
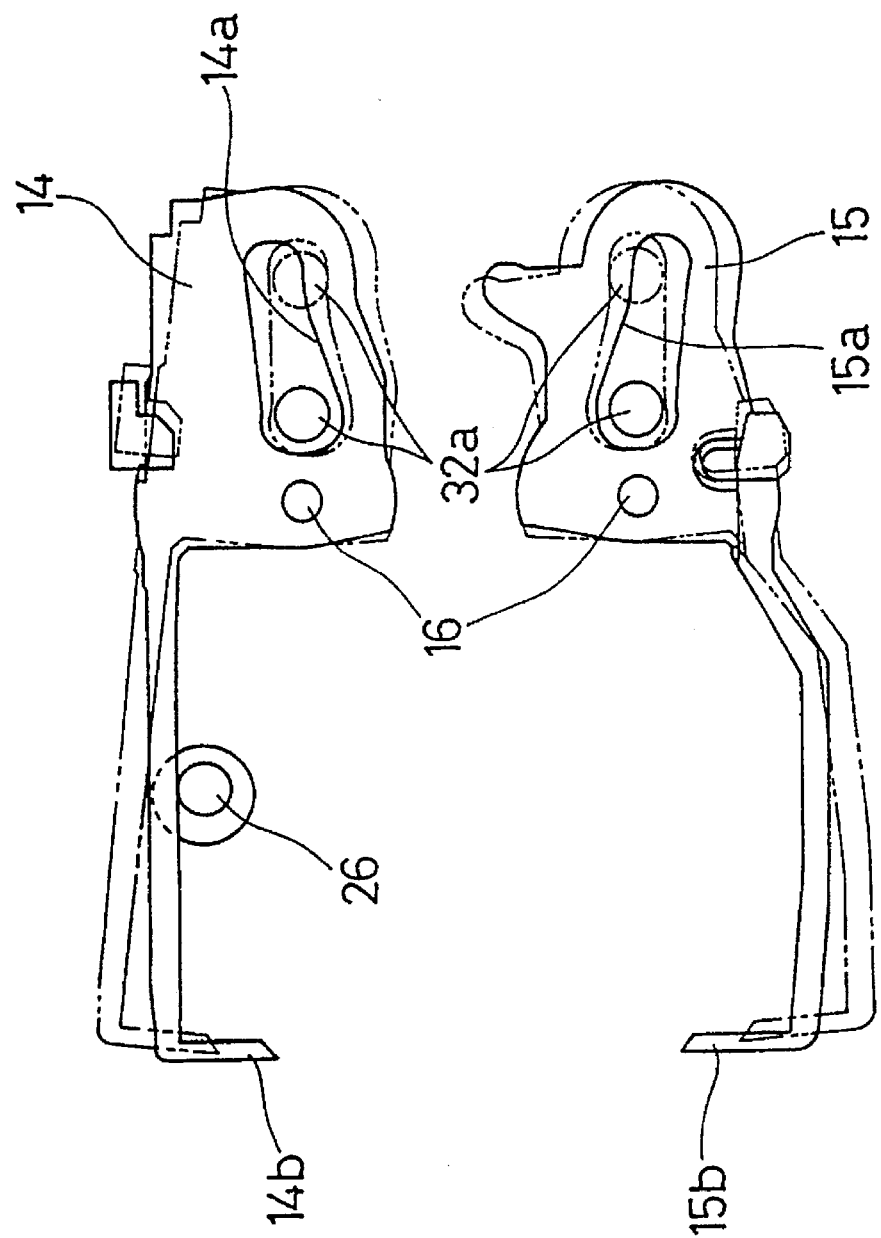
FIG. 16 shows a position relationship between wings 14 and an abutting portion 32a before and after the changeover of the finder field under the condition of FIG. 14.

FIG. 16 shows a position relationship between the wings 14 and 15 and the abutting portion 32a viewed from the eyepiece side before and after the changeover between normal photographing and panoramic photographing. The solid line shows the positions of the wings 14 and 15 and the abutting portion 32a in panoramic photographing (the positions when the tips 14b and 15b are in the image plane portion). The chain double-dashed line shows the positions of the wings 14 and 15 and the abutting portion 32a in normal photographing (the positions when the tips 14b and 15b are retreated from the image plane portion).

FIG. 15 shows the condition in panoramic photographing. The changeover from this condition to the condition in normal photographing is made in the following manner.

When the interlocking pin 32 moves leftward along the hole 1c, the cum surface 14a formed on the wing 14 is pushed down by the abutting portion 32a of the interlocking pin 32, and the cum surface 15a formed on the wing 15 is pushed up by the abutting portion 32a of the interlocking pin 32. Consequently, the wing 14 rotates counterclockwise about the pin 16, whereas the wing 15 rotates clockwise about the pin 16. As a result, the tips 14b and 15b retreat from the image plane portion while the distance therebetween increasing. When the tips 14b and 15b are retreated in this manner, the finder field is restricted to the one for normal photographing only by the stationary field frame 25.

Subsequently, the changeover from the condition in normal photographing to the condition in panoramic photographing will be described. As shown in FIG. 14, abutting portions 17a and 17b formed at the tips of the spring 17 are hung on hooks 14d and 15d, respectively. By the spring 17, the wing 14 is pushed upward at the hook 14d and the wing 15 is pushed downward at the hook 15d. Therefore, the tips 14b and 15b of the wings 14 and 15 are pushed so that the distance therebetween decreases. In panoramic photographing, as shown in FIG. 15, the abutting portion 14c (in FIG. 15, the abutting portion 14c protrudes toward the reader's side) abuts the abutting portion 15c to restrict the distance between the tips 14b and 15b. That is, the spring 17 acts on the wings 14 and 15 so that the vertical dimension of the finder field decreases. The abutting portions 14c and 15c define their driving stop position.

On the hook 14d and the cover 3, abutting portions 27a and 27b formed at the tips of the spring 27 are hung. By the spring 27, the wing 14 is pushed upward at the hook 14d. As a result, the wing 14 is pushed in a direction to go into the image plane portion. In panoramic photographing, as shown in FIG. 15, the wing 14 abuts an adjusting pin 26 to restrict the position of the wing 14.

Therefore, in making the changeover from normal photographing to panoramic photographing, when the interlocking pin 32 is moved rightward in FIG. 15 (leftward in FIG. 16) by an operation member (not shown), the interlocking pin 32 is retreated from the cum surfaces 14a and 15a, so that the tips 14b and 15b go into the image plane portion while being closed until the abutting portions 14c and 15c are made to abut each other by the spring 17 (FIG. 14), and with the distance (corresponding to the vertical length of the finder field) being maintained, the wing 14 is made to abut the adjusting pin 26 by the spring 27 (FIG.. 14) to decide the positions relative to the optical system (the relative positions of the tips 14b and 15b with respect to the vertical dimension of the finder field). Moreover, since the adjusting pin 26 is decentered as shown in FIGS. 14 to 16, by turning the adjusting pin 26, the positions relative to the optical system is adjusted while the distance with the tips 14b and 15b being maintained.

As described above, since the wings 14 and 15 are provided with the portions for restricting their driving stop position (i.e. the portions at which the abutting portions 14c and 15c and the adjusting pin 26 of the wings 14 and 15 abut in FIG. 15) and the portions for restricting the finder field (i.e. the tips 14b and 15b), and no other members are present therebetween, the positional accuracy of the tips 14b and 15b are obtained easily. As a result, the finder field is restricted with a high accuracy. Further, since the arrangement is simple such that only the movement of the operation member serving as the driving source is directly converted to the rotation of one axis, only a small number of parts is required, thereby reducing the cost of the camera. In addition, since the finder is compact and made of only a small number of parts, its arrangement in the camera is not limited, thereby reducing the size of the camera.

Moreover, since the pin 16 about which the wings 14 and 15 rotate is located parallel to the image plane, the distance between the prisms 85 and 86 located in the vicinity of the image plane into which the tips 14b and 15b are inserted is reduced approximately by the thicknesses of the tips 14b and 15b. As a result, the total length of the optical system is decreased to further reduce the size of the camera.

Figure 22:
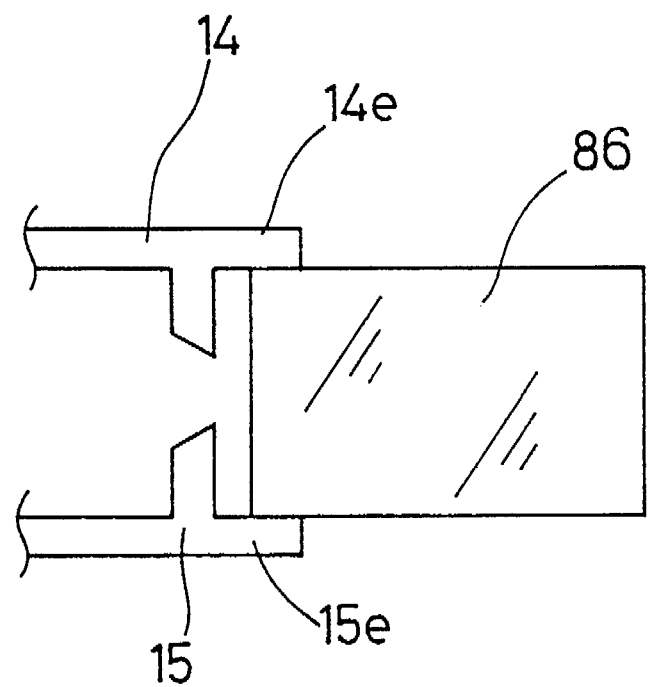
FIG. 22 shows a relevant portion of another embodiment of the present invention.

FIG. 22 shows a relevant portion of another embodiment where the positioning relative to the optical system is not performed. Other portions are arranged in a manner similar to the above-described embodiment. When the parts error is small and the positioning relative to the optical axis is unnecessary, position restricters 14e and 15e are provided to the wings 14 and 15, respectively, as shown in FIG. 22, and the position restricters 14e and 15e are made to directly abut the prism 86 to decide the distance between the tips 14b and 15b and the position relative to the optical system. The position restricters 14e and 15e are made to abut the prism 86 since the attachment error is smaller when the positioning is performed relative to an optical part (i.e. prism 86) located at a position where an image plane is formed.

As described above, since the finder field is restricted by the rotation of the movable field frame, the driving mechanism is simplified, thereby reducing the number of parts. As a result, a simple and compact arrangement is realized without the design of the optical system being limited. For example, since the arrangement may be simple such that only the movement of the operation member serving as the driving source is directly converted to the rotation of one axis, only a small number of parts is required, thereby reducing the cost of the camera. Since only a small number of parts is required, the size of the camera is reduced without the arrangement of the finder in the camera being limited.

Since the center of the rotation is located parallel to the image plane, the distance between the optical parts in the vicinity of the image plane into which the movable field frame is inserted is reduced approximately by the thickness of the movable frames. As a result, the total length of the optical system is decreased to reduce the size of the camera.

Since the center of the rotation is located away from the image plane, dust hardly intrudes into the vicinity of the image plane. When the center of the rotation is located away from the image plane, for example, since the portion at which the cum serving as the driving force inputter is readily arranged away from the image plane, even if dust intrudes from the driving force inputter or the vicinity thereof, it is prevented from intruding as far as the image plane.

Since the movable field frame rotates to restrict the finder field, the movable field frame is provided with the portion for restricting its driving stop position and the portion for restricting the finder field, and no other parts are provided therebetween. As a result, the position accuracy of the movable field frame is obtained easily, and the finder field is restricted with a high accuracy. Since no space for the rotation of the wings is required along the finder optical axis, when positioning is required, a mechanism for positioning the movable field frame is readily added. As a result, the finder field is restricted with a high accuracy. In addition, when the movable field frame is constituted by two wings, by rotating the two wings about the same axis of rotation, the finder field is restricted with a high accuracy.

Obviously, many modifications and variations of the present invention are possible in light of the above teachings. It is therefore to be understood that within the scope of the appended claims, the invention may be practiced other than as specifically described.

TABLE 1

<1st embodiment>
[Optical System Data]
ω = 25.19° to 10.74°, Γ = 0.423 to 1.049

| Surface No. | Lens system | Unit | CR | T | Ne | νe |
|---|---|---|---|---|---|---|
| 1 | Ob- | 1st | 23.382 | | | |
| | jective | unit | | 2.000 | 1.49329 | 57.64 |
| 2* | system | | −16.059 | | | |
| | | | | T1 | 1.000 | |
| 3 | | 2nd | −19.647 | | | |
| | | unit | | 1.000 | 1.58752 | 30.24 |
| 4* | | | 13.422 | | | |
| | | | | T2 | 1.000 | |
| 5 | | 3rd | −14.852 | | | |
| | | unit | | 1.000 | 1.58752 | 30.24 |
| 6 | | | 40.294 | | | |
| | | | | T3 | 1.000 | |
| 7* | | 4th | 8.073 | | | |
| | | unit | | 3.300 | 1.49329 | 57.64 |
| 8* | | | −7.021 | | | |
| | | | | 0.321 | 1.000 | |
| 9 | Image | | ∞ | | | |
| | erect- | | | 15.500 | 1.57850 | 33.99 |
| 10 | ing | | ∞ | | | |
| | system | | | 1.500 | 1.000 | |
| 11 | Eye- | Eye- | 22.500 | | | |
| | piece | piece | | 26.126 | 1.58752 | 30.24 |
| 12 | system | system | ∞ | | | |
| | | | | 0.500 | 1.000 | |
| 13 | | | 21.005 | | | |
| | | | | 2.000 | 1.49329 | 57.64 |
| 14* | | | −15.010 | | | |

TABLE 2

<1st embodiment>
[Aspherical Surface Data]

| Surface No. | ε | A4 | A6 | A8 |
|---|---|---|---|---|
| 2* | −5.619 | 0 | 0 | 0 |
| 4* | −10.656 | 0 | 0 | 0 |
| 7* | −2.339 | 0 | 0 | 0 |
| 8* | −0.580 | 0 | 0 | 0 |
| 14* | −2.000 | 0 | 0 | 0 |

TABLE 3

<1st embodiment>
[Variation in Axial Distance Caused by Zooming]

| Position | Wide | Middle | Tele |
|---|---|---|---|
| Γ | 0.423 | 0.667 | 1.049 |
| T1 | 0.350 | 4.021 | 6.346 |
| T2 | 2.585 | 1.732 | 3.837 |
| T3 | 7.665 | 4.847 | 0.418 |

TABLE 4

<1st embodiment>
[Conditions (1) to (3)]

| | |
|---|---|
| $\beta_{ZT}$ | 12.611 |
| $L_2/L_3$ | 0.827 |
| $\phi_2/\phi_3$ | 1.367 |

TABLE 5

<2nd embodiment>
[Optical System Data]
ω = 25.27° to 8.09°, Γ = 0.395 to 1.312

| Surface No. | Lens system | Unit | CR | T | Ne | νe |
|---|---|---|---|---|---|---|
| 1 | Ob- | 1st | 14.864 | | | |
| | jective | unit | | 2.400 | 1.49329 | 57.64 |
| 2* | system | | −36.444 | | | |
| | | | | T1 | 1.000 | |
| 3 | | 2nd | −33.986 | | | |
| | | unit | | 1.000 | 1.49329 | 57.64 |
| 4* | | | 6.512 | | | |
| | | | | T2 | 1.000 | |
| 5 | | 3rd | −5.583 | | | |
| | | unit | | 1.000 | 1.58752 | 30.24 |
| 6 | | | −17.289 | | | |
| | | | | T3 | 1.000 | |
| 7* | | 4th | 8.527 | | | |
| | | unit | | 3.400 | 1.49329 | 57.64 |
| 8* | | | −6.100 | | | |
| | | | | 1.785 | 1.000 | |
| 9 | Image | | ∞ | | | |
| | erect- | | | 15.500 | 1.57850 | 33.99 |
| 10 | ing | | ∞ | | | |
| | system | | | 1.500 | 1.000 | |
| 11 | Eye- | Eye- | 22.500 | | | |
| | piece | piece | | 26.126 | 1.58752 | 30.24 |
| 12 | system | system | ∞ | | | |
| | | | | 0.500 | 1.000 | |
| 13 | | | 21.005 | | | |
| | | | | 2.000 | 1.49329 | 57.64 |
| 14* | | | −15.010 | | | |

TABLE 6

<2nd embodiment>
[Aspherical Surface Data]

| Surface No. | ε | A4 | A6 | A8 |
|---|---|---|---|---|
| 2* | −19.088 | 0 | 0 | 0 |
| 4* | 0.040 | 0 | 0 | 0 |
| 7* | −4.215 | 0 | 0 | 0 |
| 8* | −0.069 | 0 | 0 | 0 |
| 14* | −2.000 | 0 | 0 | 0 |

TABLE 7

<2nd embodiment>
[Variation in Axial Distance Caused by Zooming]

| Position | Wide | Middle | Tele |
|---|---|---|---|
| Γ | 0.395 | 0.720 | 1.312 |
| T1 | 0.500 | 5.638 | 9.104 |
| T2 | 6.800 | 2.911 | 2.865 |
| T3 | 5.100 | 3.851 | 0.432 |

TABLE 8

<2nd embodiment>
[Conditions (1) to (3)]

| | |
|---|---|
| $\beta_{ZT}$ | 155.380 |
| $L_2/L_3$ | 1.843 |
| $\phi_2/\phi_3$ | 1.319 |

TABLE 9

<3rd embodiment>
[Optical System Data]
$\omega = 25.19°$ to $7.60°$, $\Gamma = 0.440$ to $1.550$

| Surface No. | Lens system | Unit | CR | T | Ne | νe |
|---|---|---|---|---|---|---|
| 1 | Objective system | 1st unit | 20.044 | | | |
| | | | | 2.000 | 1.49329 | 57.64 |
| 2* | | | −18.788 | | | |
| | | | | T1 | 1.000 | |
| 3 | | 2nd unit | −16.260 | | | |
| | | | | 1.000 | 1.49329 | 57.64 |
| 4* | | | 9.208 | | | |
| | | | | T2 | 1.000 | |
| 5 | | 3rd unit | −12.874 | | | |
| | | | | 1.000 | 1.58752 | 30.24 |
| 6 | | | 35.844 | | | |
| | | | | T3 | 1.000 | |
| 7* | | 4th unit | 9.020 | | | |
| | | | | 3.300 | 1.49329 | 57.64 |
| 8* | | | −7.617 | | | |
| | | | | 3.133 | 1.000 | |
| 9 | Image erecting system | | ∞ | | | |
| | | | | 15.500 | 1.57850 | 33.99 |
| 10 | | | ∞ | | | |
| | | | | 1.500 | 1.000 | |
| 11 | Eyepiece system | Eyepiece system | 22.500 | | | |
| | | | | 26.126 | 1.58752 | 30.24 |
| 12 | | | ∞ | | | |
| | | | | 0.500 | 1.000 | |
| 13 | | | 21.005 | | | |
| | | | | 2.000 | 1.49329 | 57.64 |
| 14* | | | −15.010 | | | |

TABLE 10

<3rd embodiment>
[Aspherical Surface Data]

| Surface No. | ε | A4 | A6 | A8 |
|---|---|---|---|---|
| 2* | −6.604 | 0 | 0 | 0 |
| 4* | −4.771 | 0 | 0 | 0 |
| 7* | −2.981 | 0 | 0 | 0 |
| 8* | −0.293 | 0 | 0 | 0 |
| 14* | −2.000 | 0 | 0 | 0 |

TABLE 11

<3rd embodiment>
[Variation in Axial Distance Caused by Zooming]

| Position | Wide | Middle | Tele |
|---|---|---|---|
| Γ | 0.440 | 0.826 | 1.550 |
| T1 | 0.500 | 5.529 | 8.389 |
| T2 | 3.500 | 1.113 | 3.682 |
| T3 | 8.300 | 5.657 | 0.229 |

TABLE 12

<3rd embodiment>
[Conditions (1) to (3)]

| | |
|---|---|
| $\beta_{ZT}$ | 9.525 |
| $L_2/L_3$ | 0.977 |
| $\phi_2/\phi_3$ | 1.360 |

TABLE 13

<4th embodiment>
[Optical System Data]
$\omega = 25.19°$ to $5.71°$, $\Gamma = 0.440$ to $2.070$

| Surface No. | Lens system | Unit | CR | T | Ne | νe |
|---|---|---|---|---|---|---|
| 1 | Objective system | 1st unit | 14.524 | | | |
| | | | | 3.500 | 1.49329 | 57.64 |
| 2* | | | −22.659 | | | |
| | | | | T1 | 1.000 | |
| 3 | | 2nd unit | −24.068 | | | |
| | | | | 1.000 | 1.49329 | 57.64 |
| 4* | | | 6.993 | | | |
| | | | | T2 | 1.000 | |
| 5 | | 3rd unit | −7.061 | | | |
| | | | | 1.000 | 1.58752 | 30.24 |
| 6 | | | 79.378 | | | |
| | | | | T3 | 1.000 | |
| 7* | | 4th unit | 9.508 | | | |
| | | | | 3.500 | 1.49329 | 57.64 |
| 8* | | | −7.222 | | | |
| | | | | 16.131 | 1.000 | |
| 9 | Eyepiece system | Image erecting system | Eyepiece system | 32.500 | | |
| | | | | 26.126 | 1.58752 | 30.24 |
| 10 | | | ∞ | | | |
| | | | | 0.500 | 1.000 | |
| 11 | | | 21.005 | | | |
| | | | | 2.000 | 1.49329 | 57.64 |
| 12* | | | −15.010 | | | |

TABLE 14

<4th embodiment>
[Aspherical Surface Data]

| Surface No. | ε | A4 | A6 | A8 |
|---|---|---|---|---|
| 2* | 1.000 | $0.131 \times 10^{-3}$ | $-0.481 \times 10^{-6}$ | $0.386 \times 10^{-8}$ |
| 4* | −1.204 | 0 | 0 | 0 |
| 7* | −3.243 | 0 | 0 | 0 |
| 8* | −0.186 | 0 | 0 | 0 |
| 12* | −2.000 | 0 | 0 | 0 |

TABLE 15

<4th embodiment>
[Variation in Axial Distance Caused by Zooming]

| Position | Wide | Middle | Tele |
|---|---|---|---|
| Γ | 0.440 | 0.954 | 2.070 |
| T1 | 0.500 | 5.614 | 7.977 |
| T2 | 5.200 | 2.446 | 5.215 |
| T3 | 8.000 | 5.640 | 0.508 |

TABLE 16

<4th embodiment>
[Conditions (1) to (3)]

| | |
|---|---|
| $\beta_{ZT}$ | 4.695 |
| $L_2/L_3$ | 0.998 |
| $\phi_2/\phi_3$ | 1.011 |

TABLE 17

<5th embodiment>
[Optical System Data]
ω = 25.19° to 4.77°, Γ = 0.440 to 2.480

| Surface No. | Lens system | | Unit | CR | T | Ne | νe |
|---|---|---|---|---|---|---|---|
| 1 | Objective system | | 1st unit | 14.118 | | | |
| | | | | | 3.500 | 1.49329 | 57.64 |
| 2* | | | | −23.763 | | | |
| | | | | | T1 | 1.000 | |
| 3 | | | 2nd unit | −22.594 | | | |
| | | | | | 1.000 | 1.49329 | 57.64 |
| 4* | | | | 6.794 | | | |
| | | | | | T2 | 1.000 | |
| 5 | | | 3rd unit | −7.351 | | | |
| | | | | | 1.000 | 1.58752 | 30.24 |
| 6 | | | | 38.373 | | | |
| | | | | | T3 | 1.000 | |
| 7* | | | 4th unit | 10.224 | | | |
| | | | | | 3.300 | 1.49329 | 57.64 |
| 8* | | | | −7.471 | | | |
| | | | | | 17.652 | 1.000 | |
| 9 | Eyepiece system | Image erecting system | Eyepiece system | 32.500 | | | |
| | | | | | 26.126 | 1.58752 | 30.24 |
| 10 | | | | ∞ | | | |
| | | | | | 0.500 | 1.000 | |
| 11 | | | | 21.005 | | | |
| | | | | | 2.000 | 1.49329 | 57.64 |
| 12* | | | | −15.010 | | | |

TABLE 18

<5th embodiment>
[Aspherical Surface Data]

| Surface No. | ϵ | A4 | A6 | A8 |
|---|---|---|---|---|
| 2* | 1.000 | 0.133 × 10⁻³ | −0.612 × 10⁻⁶ | 0.131 × 10⁻⁸ |
| 4* | −1.469 | 0 | 0 | 0 |
| 7* | −3.168 | 0 | 0 | 0 |
| 8* | −0.206 | 0 | 0 | 0 |
| 12* | −2.000 | 0 | 0 | 0 |

TABLE 19

<5th embodiment>
[Variation in Axial Distance Caused by Zooming]

| Position | Wide | Middle | Tele |
|---|---|---|---|
| Γ | 0.440 | 1.044 | 2.480 |
| T1 | 0.500 | 6.117 | 8.477 |
| T2 | 5.200 | 2.028 | 5.418 |
| T3 | 8.700 | 6.255 | 0.535 |

TABLE 20

<5th embodiment>
[Conditions (1) to (3)]

| | |
|---|---|
| $\beta_{2T}$ | 4.318 |
| $L_2/L_3$ | 0.973 |
| $\phi_2/\phi_3$ | 0.995 |

What is claimed is:

1. A compact high-zoom-ratio real-image finder comprising an objective lens system including from an object side a first lens unit having a positive power, a second lens unit having a negative power, a third lens unit having a negative power and a fourth lens unit having a positive power, wherein zooming is performed by moving the second and third lens units in a same direction.

2. A compact high-zoom-ratio real-image finder as claimed in claim 1, wherein $$\beta_{2T} > 0$$

where $\beta_{2T}$ is an image formation magnification of the second lens unit at a highest magnification condition.

3. A compact high-zoom-ratio real-image finder as claimed in claim 1, wherein $$0.7 < \frac{\phi_2}{\phi_3} < 1.5$$

where $\phi_2$ is a power of the second lens unit and $\phi_3$ is a power of the third lens unit.

4. A compact high-zoom-ratio real-image finder as claimed in claim 1, wherein $$0.7 < \frac{L_2}{L_3} < 2.0$$

where L2 is a movement amount of the second lens unit and L3 is a movement amount of the third lens unit.

5. A compact high-zoom-ratio real-image finder as claimed in claim 1, wherein the second and third lens units move with an aperture between, said aperture being conjugate with a finder exit pupil projected at the object side of an image plane by an eyepiece system.

6. A compact high-zoom-ratio real-image finder as claimed in claim 5, wherein a luminous flux restricting member for cutting off unnecessary luminous flux is provided on either of a holder for the second lens unit and a holder for the third lens unit.

7. A compact high-zoom-ratio real-image finder as claimed in claim 1, wherein an aspherical surface is provided at least in the fourth lens unit.

8. A compact high-zoom-ratio real-image finder as claimed in claim 1, wherein the second lens unit includes a negative lens element strongly concave to an image side and the third lens unit includes a negative lens element strongly convex to the object side.

\* \* \* \* \*